(12) United States Patent
Huang et al.

(10) Patent No.: US 10,410,084 B2
(45) Date of Patent: Sep. 10, 2019

(54) DEVICES, SYSTEMS, AND METHODS FOR ANOMALY DETECTION

(71) Applicant: Canon Virginia, Inc., Newport News, VA (US)

(72) Inventors: Hung Khei Huang, Irvine, CA (US); Bradley Scott Denney, Irvine, CA (US); Yang Yang, Sunnyvale, CA (US)

(73) Assignee: Canon Virginia, Inc., Newport News, VA (US)

( * ) Notice: Subject to any disclaimer, the term of this patent is extended or adjusted under 35 U.S.C. 154(b) by 12 days.

(21) Appl. No.: 15/793,759

(22) Filed: Oct. 25, 2017

(65) Prior Publication Data

US 2018/0114092 A1    Apr. 26, 2018

Related U.S. Application Data

(60) Provisional application No. 62/480,735, filed on Apr. 3, 2017, provisional application No. 62/413,207, filed on Oct. 26, 2016.

(51) Int. Cl.
| | |
|---|---|
| *G06K 9/62* | (2006.01) |
| *G06T 7/00* | (2017.01) |
| *G06K 9/00* | (2006.01) |
| *G06K 9/20* | (2006.01) |

(52) U.S. Cl.
CPC ....... *G06K 9/6212* (2013.01); *G06K 9/00523* (2013.01); *G06T 7/0002* (2013.01); *G06T 7/97* (2017.01); *G06K 2009/2045* (2013.01); *G06T 2207/10012* (2013.01); *G06T 2207/30164* (2013.01)

(58) Field of Classification Search
CPC ............ G06K 9/6212; G06K 9/00523; G06K 2009/2045; G06T 7/0002; G06T 7/97; G06T 2207/10012; G06T 2207/30164
See application file for complete search history.

(56) References Cited

U.S. PATENT DOCUMENTS

| | | | |
|---|---|---|---|
| 6,005,978 | A | 12/1999 | Garakani |
| 6,320,976 | B1 | 11/2001 | Murthy |
| 7,318,005 | B1 | 1/2008 | Smaragdis |
| 7,440,607 | B1 | 10/2008 | Lin |
| 7,715,623 | B2 | 5/2010 | Ling |
| 8,107,717 | B2 | 1/2012 | Maeda |
| 8,131,107 | B2 | 3/2012 | Sun |
| 8,238,635 | B2 | 8/2012 | Can |
| 8,345,949 | B2 | 1/2013 | Zhao |
| 8,442,301 | B2 | 5/2013 | Dragovich |
| 8,867,787 | B2 | 10/2014 | Singamsetti |

(Continued)

OTHER PUBLICATIONS

Cha et al., "On measuring the distance between histograms", Pattern Recognition, 35 (2002) pp. 1355-1370 (Year: 2002).*

(Continued)

*Primary Examiner* — Qian Yang
(74) *Attorney, Agent, or Firm* — Canon U.S.A., Inc. IP Division

(57) ABSTRACT

Devices, systems, and methods obtain a first image, obtain a second image, calculate respective distances between a histogram from a patch in the first image to respective histograms from patches in the second image, and identify a patch in the second image that is most similar to the patch in the first image based on the respective distances.

20 Claims, 36 Drawing Sheets

(56) References Cited

U.S. PATENT DOCUMENTS

| | | | |
|---|---|---|---|
| 9,170,543 B2 | 10/2015 | Arakawa | |
| 9,256,920 B1 | 2/2016 | Choudhury | |
| 9,378,552 B2 | 6/2016 | Sato | |
| 9,400,256 B2 | 7/2016 | Henderkott | |
| 9,405,991 B2 | 8/2016 | Sharma | |
| 9,460,490 B2 | 10/2016 | Choudhury | |
| 9,619,755 B2 | 4/2017 | Wang | |
| 2010/0177955 A1* | 7/2010 | Simakov | G06K 9/00711 382/154 |
| 2013/0148987 A1* | 6/2013 | Arakawa | G03G 15/5062 399/15 |
| 2014/0270489 A1 | 9/2014 | Lim | |
| 2015/0227809 A1 | 8/2015 | Alpert | |
| 2016/0063677 A1* | 3/2016 | Deamo | G06T 3/4053 382/199 |
| 2018/0082410 A1* | 3/2018 | Schulte | G06T 5/40 |

OTHER PUBLICATIONS

Cohen et al., "The Earth Mover's Distance under Transformation Sets", Proceeding of the 7th IEEE International Conference on Computer Vision, Sep. 1999 (Year: 1999).*
V Lashkia, Defect detection in X-ray images using fuzzy reasoning, Image and Vision Computing, vol. 19, Issue 5, Apr. 2001, Abstract.
Nick Kingsbury, Complex Wavelets for Shift Invariant Analysis and Filtering of Signals, May 2001.
Roumen Kountchev et al., Defects detection in X-ray images and photos, Feb. 2011.
J. Hassan et al., Welding Defect Detection and Classification Using Geometric Features, Dec. 2012.
Shekhar B. Sastry, Computationally Efficient Methods for Shift-variant Image Restoration in Two and Three Dimensions, Sep. 2011.
Ian T. Young et al., Fundamentals of Image Processing, Jul. 2004.
Tian Yuan et al., Automatic Defect Detection in X-Ray Images Using Image Data Fusion, Dec. 2006.
Caixia Zheng et al., An improved method for object detection in astronomical images, Jun. 2015.
Richard Szeliski, Computer Vision: Algorithms and Applications, pp. i-73, Sep. 2010.
Richard Szeliski, Computer Vision: Algorithms and Applications, pp. 73-174, Sep. 2010.
Richard Szeliski, Computer Vision: Algorithms and Applications, pp. 174-266, Sep. 2010.
Richard Szeliski, Computer Vision: Algorithms and Applications, pp. 267-363, Sep. 2010.
Richard Szeliski, Computer Vision: Algorithms and Applications, pp. 363-466, Sep. 2010.
Richard Szeliski, Computer Vision: Algorithms and Applications, pp. 467-575, Sep. 2010.
Richard Szeliski, Computer Vision: Algorithms and Applications, pp. 577-679, Sep. 2010.
Richard Szeliski, Computer Vision: Algorithms and Applications, pp. 679-776, Sep. 2010.
Richard Szeliski, Computer Vision: Algorithms and Applications, pp. 777-789 and 933-957, Sep. 2010.

* cited by examiner

DEVICES, SYSTEMS, AND METHODS FOR ANOMALY DETECTION

CROSS-REFERENCE TO RELATED APPLICATIONS

This application claims the benefit of U.S. Application No. 62/413,207, which was filed on Oct. 26, 2016, and the benefit of U.S. Application No. 62/480,735, which was filed on Apr. 3, 2017.

BACKGROUND

Technical Field

This application generally relates to detecting anomalies in images.

Background

Nondestructive testing techniques are used to examine the properties of objects without causing damage to the objects. These techniques can be used in a quality-control process to identify defects in the object.

SUMMARY

Some embodiments of a device comprise one or more processors and one or more computer-readable media that are coupled to the one or more processors. The one or more computer-readable media include instructions for obtaining a first image, obtaining a second image, calculating respective distances between a histogram from a patch in the first image to respective histograms from patches in the second image, and identifying a patch in the second image that is most similar to the patch in the first image based on the respective distances.

Some embodiments of a method comprise obtaining a first image, obtaining a second image, calculating respective dissimilarity scores between a histogram from a patch in the first image to respective histograms from patches in the second image, and identifying a patch in the second image that is most similar to the patch in the first image based on the respective dissimilarity scores.

Some embodiments of one or more computer-readable media store computer-executable instructions that, when executed by one or more computing devices, cause the one or more computing devices to perform operations that comprise obtaining a first image, obtaining a second image, and calculating respective dissimilarity scores between a histogram from a first patch in the first image to respective histograms from patches in the second image. Also, the patches in the second image include a central patch and other patches that are offset from and partially overlap the central patch.

DETAILED DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
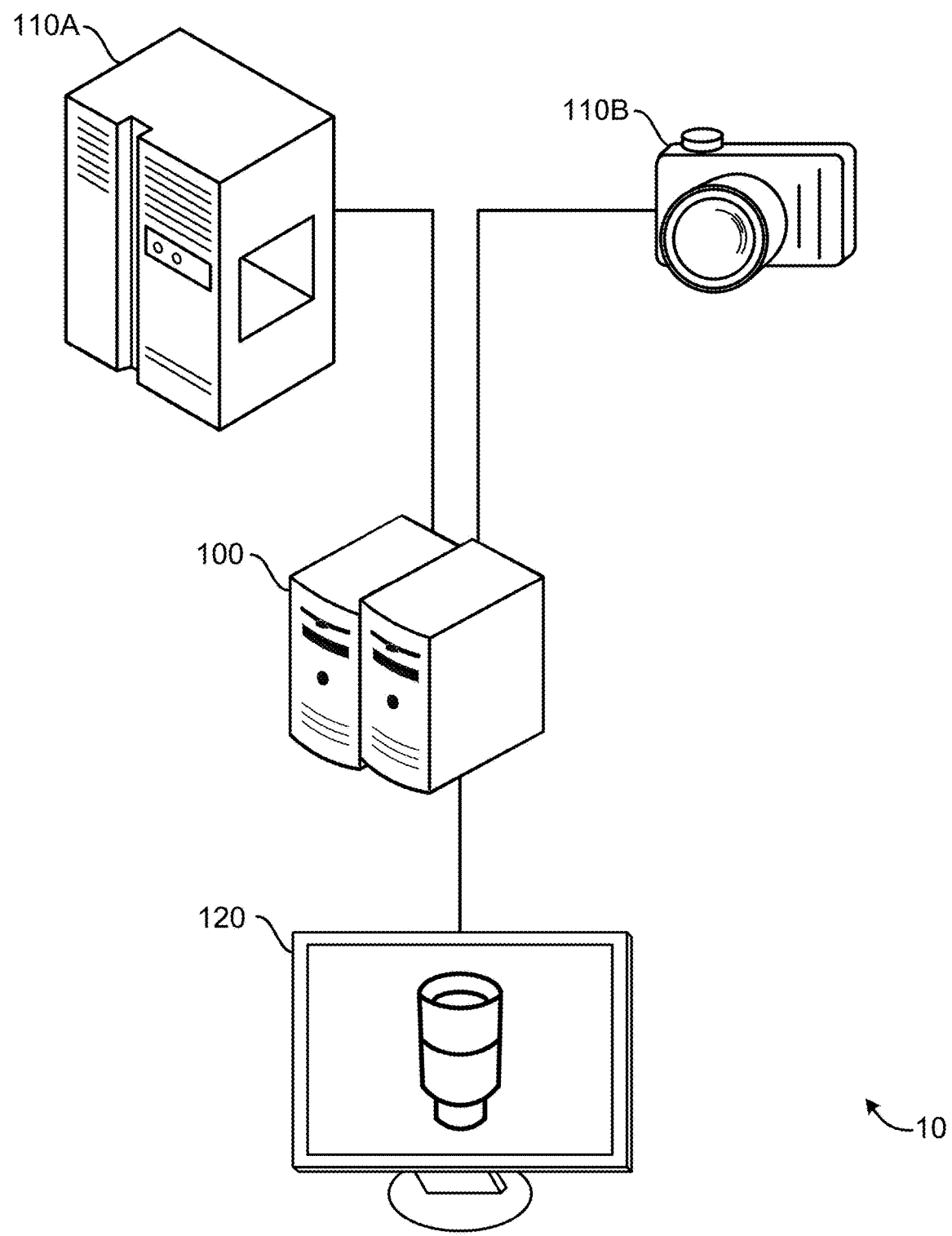
FIG. 1 illustrates an example embodiment of a system for anomaly detection.

FIG. 1 illustrates an example embodiment of a system for anomaly detection. The system 10 includes one or more detection devices 100, which are specially-configured computing devices; one or more image-capturing devices, such as an x-ray detector 110A or a camera 110B; and at least one display device 120.

The system 10 detects anomalies in images (e.g., x-ray images) based on image-patch differences between a test image and trained similarity measures (e.g., similarity scores, dissimilarity scores). The similarity measures represent the expected variation of a visual feature (e.g., a patch histogram) between non-anomalous images and selected reference non-anomalous images. An anomaly in an image of an object may indicate a defect in the object.

The system 10 implements a training phase that generates the trained similarity measures based on a prime image, on a set of reference images, and on a set of training images. The operations that are performed during the training phase may include one or more of the following: (A) enhancing edges in the images (e.g., applying a Laplacian of Gaussian filter to enhance edges); (B) adjusting the intensity of the training images and the reference images to match the prime image's average intensity; (C) globally aligning the training images and the reference images to match the prime image; (D) computing image features (e.g., intensity histograms of feature patches); and (E) performing local-patch alignment.

The system 10 divides images into local patches (each of which includes two or more feature patches), and the system 10 aligns each local patch to a corresponding local patch in the prime image or the reference image before computing feature differences (e.g., a score that indicates dissimilarity). The training produces normal-similarity-score maps: one for the prime image, and one for each of the reference images.

During the detection phase, for a given test image, the system 10 may perform one or more of the following operations: (A) obtaining normal-similarity-score maps (which may be in the form of one or more normal-similarity-score matrices); (B) enhancing edges in the test image and in the reference images (e.g., applying Laplacian of Gaussian filter to enhance the edges); (C) adjusting the intensity of the test image or the reference images to match the prime image's average intensity; (D) globally aligning the test image or the reference images to the prime image; (E) computing test-image features; (F) performing local-patch alignment; and (G) comparing the computed similarity scores with the corresponding feature-patch similarity score or similarity-score model (e.g., a probabilistic model that has a mean and a standard deviation) in the normal-similarity-score maps. For example, in some embodiments, if the computed similarity score for a feature patch is larger than the corresponding feature-patch similarity score in the normal-similarity-score maps for over 50% of the maps, the system 10 may count this feature patch as an anomaly patch, which may indicate a defect. The system 10 may then calculate a defect score (e.g., calculated as the sum of all the differences for the feature patch) for the patch.

The edge enhancement, the intensity adjustment, and the alignment of the reference images in operations (B)-(D) could be skipped if the system 10 saves the reference-image features that are generated during the training phase. The system 10 could load those saved features at the beginning of the detection phase.

Additionally, in operation (F), the system 10 may divide images into local patches, and the system 10 may align each local patch of the test image to a local patch of the prime image or of a reference image before computing feature differences (e.g., a similarity score) for feature patches of the local patches.

Also, different embodiments of the system 10 use different techniques and technologies to implement operation (G). For example, some embodiments use heuristic classifiers or data-trained classifiers on the scores.

Figure 2:
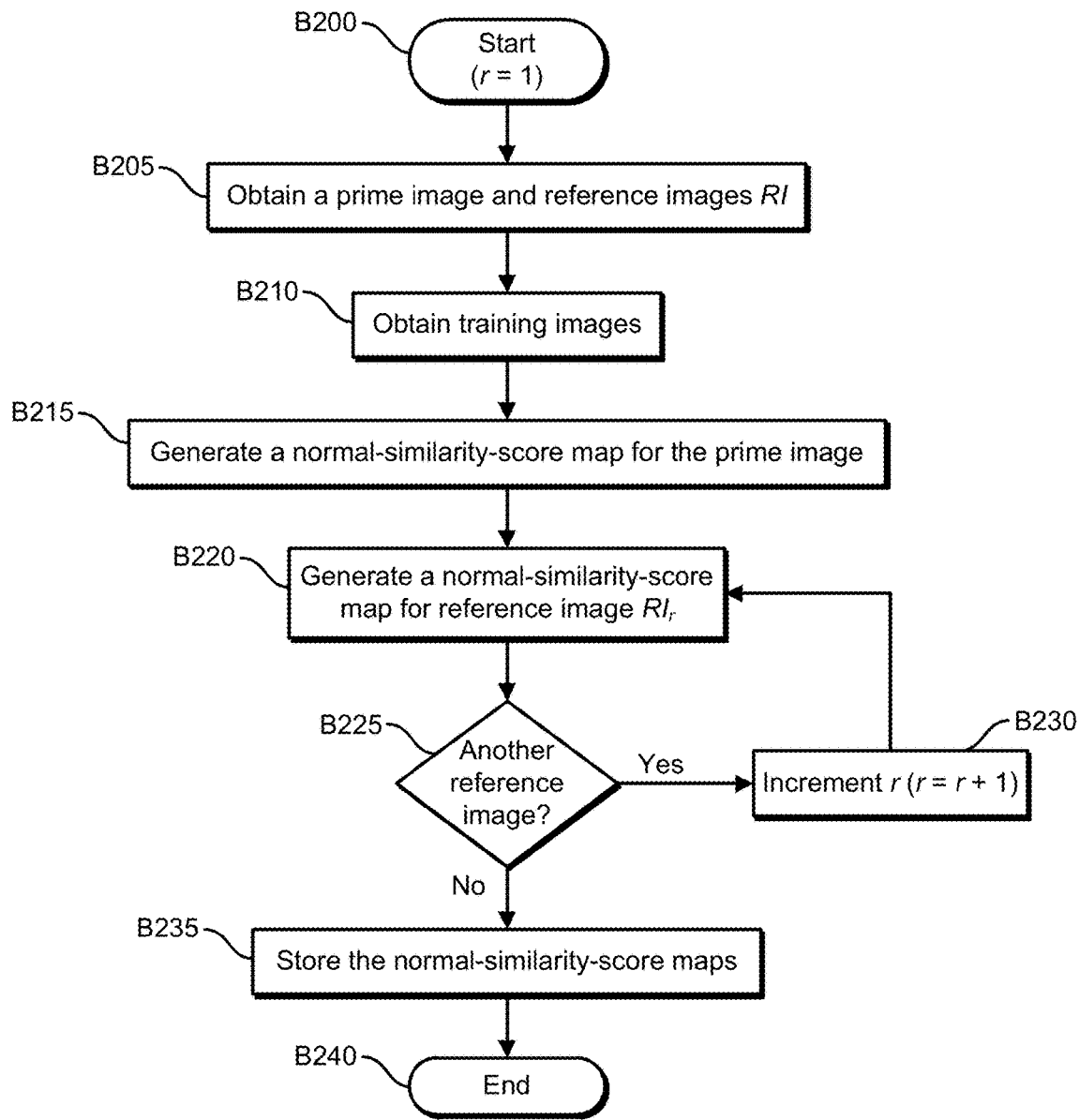
FIG. 2 illustrates an example embodiment of an operational flow for anomaly detection.

FIG. 2 illustrates an example embodiment of an operational flow for anomaly detection. Although this operational flow and the other operational flows that are described herein are each presented in a certain order, some embodiments may perform at least some of the operations in different orders than the presented orders. Examples of possible different orderings include concurrent, parallel, overlapping, reordered, simultaneous, incremental, and interleaved orderings. Thus, other embodiments of the operational flows that are described herein may omit blocks, add blocks, change the order of the blocks, combine blocks, or divide blocks into more blocks.

Furthermore, although this operational flow and some of the other operational flows that are described herein are performed by a detection device, some embodiments of these operational flows are performed by two or more detection devices or by one or more other specially-configured computing devices (e.g., one or more image-comparison devices).

The flow starts in block B200, where the detection device sets r to 1, and then the flow proceeds to block B205. In block B205, the detection device obtains a prime image and one or more reference images RI. The prime image may be a reference image that is selected as a point of reference for alignment and intensity. Next, in block B210, the detection device obtains training images.

Figure 3:
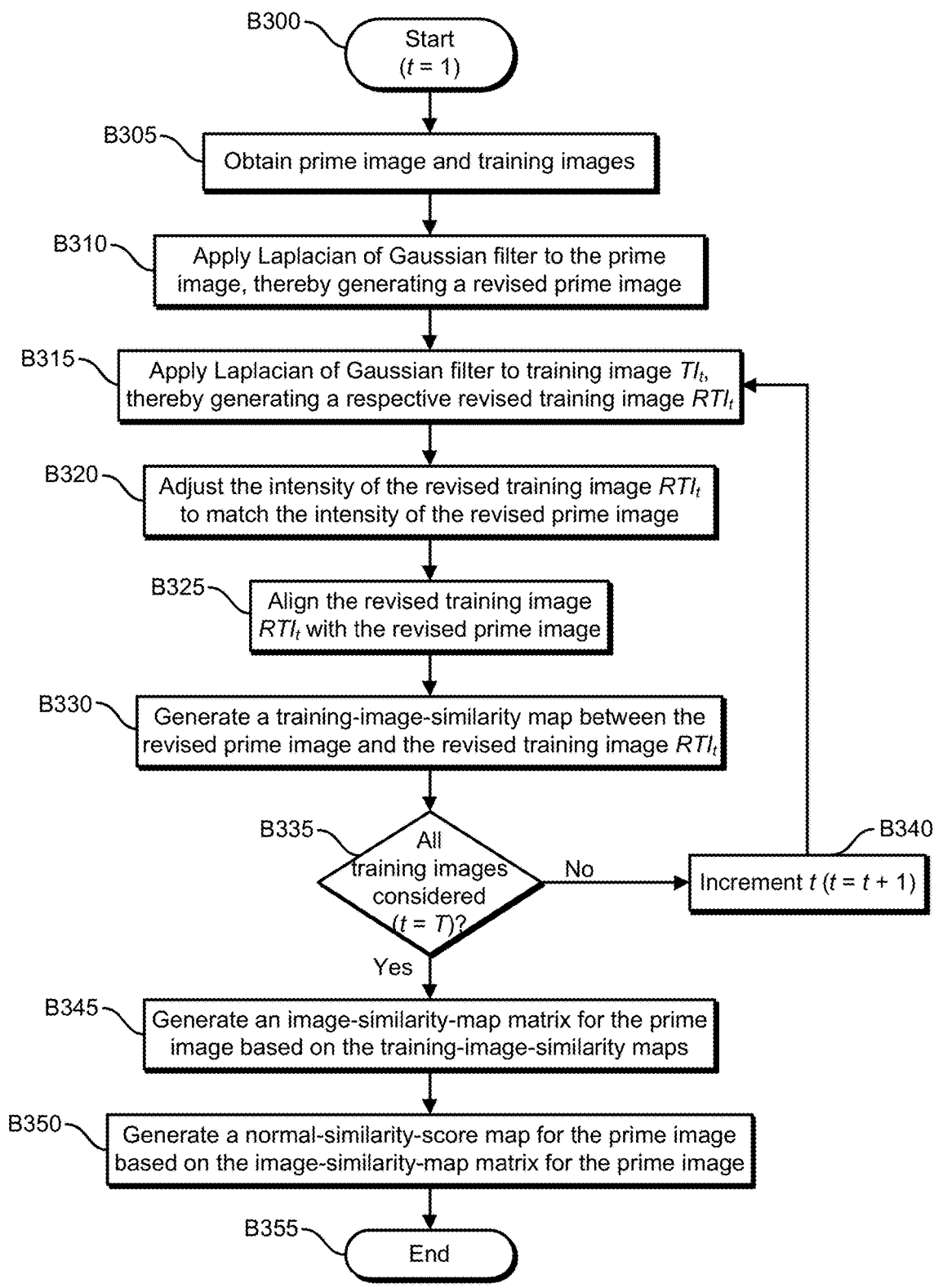
FIG. 3 illustrates an example embodiment of an operational flow for generating a normal-similarity-score map.

The flow then moves to block B215, where the detection device generates a normal-similarity-score map for the prime image, for example as described in FIG. 3. The flow then proceeds to block B220, where the detection device generates a normal-similarity-score map for reference image $RI_r$, for example as described in FIG. 4. The first time that the flow reaches block B220, the reference image will be reference image $RI_1$. Next, in block B225, the detection device determines if a normal-similarity-score map needs to be generated for another reference image. If yes (B225=Yes), then the flow moves to block B230, where the detection device increases r by one, and the flow returns to block B220. If not (B225=No), then the flow moves to block B235. In block B235, the detection device stores the normal-similarity-score maps, and then the flow ends in block B240.

FIG. 3 illustrates an example embodiment of an operational flow for generating a normal-similarity-score map. The flow starts in block B300, where a detection device sets t to 1. Next, in block B305, the detection device obtains a prime image and training images. The flow then moves to block B310, where the detection device enhances the edges of the prime image, thereby generating a revised prime image. The example embodiment of FIG. 3 applies a Laplacian of Gaussian filter to enhance the edges. Some embodiments of this operational flow use other techniques to enhance the edges, and some embodiments omit block B310.

Next, in block B315, the detection device enhances the edges of training image $TI_t$, thereby generating a respective revised training image $RTI_t$. The example embodiment of FIG. 3 applies a Laplacian of Gaussian filter to enhance the edges. Also, the first time that the flow reaches block B315, the training image $TI_t$ will be training image $TI_1$. Also, some embodiments of this operational flow use other techniques to enhance the edges, and some embodiments omit block B315.

The flow then proceeds to block B320, where the detection device adjusts the intensity of the revised training image $RTI_t$ to match the intensity of the prime image or the revised prime image. To adjust the intensity, some embodiments of the detection device compute the average pixel intensity of a target image, which is the revised training image $RTI_t$ in block B315, and compare it to the average pixel intensity of the prime image or the revised prime image. The detection device then may adjust all the pixels of the target image by the difference of the two average intensities. Also, some embodiments of the operational flow (e.g., embodiments that use a shift-invariant Earth Mover's Distance (SIEMD) in block B330) do not include block B320.

Then in block B325, the detection device globally aligns the revised training image $RTI_t$, which has an adjusted intensity in embodiments that include block B320, to the revised prime image. In embodiments that do not include block B315 and that do not include block B320, the detection device uses the training image $TI_t$ instead of the revised training image $RTI_t$ in blocks B325-B330. To align the images, some embodiments of the detection device align the images using scale invariant feature transform (SIFT) point matching or template matching. SIFT point matching extracts SIFT points from a target image (which is the revised training image $RI_t$ in block B315) and from the revised prime image and then adjusts the target image to align the matching SIFT points. Template matching slides a portion of the target image over the revised prime image (as in 2D cross-correlation) and compares the portion of the target image to a patch of the prime image that is under the portion of the target image. The position with the best score is used to align the two images.

Figure 5:
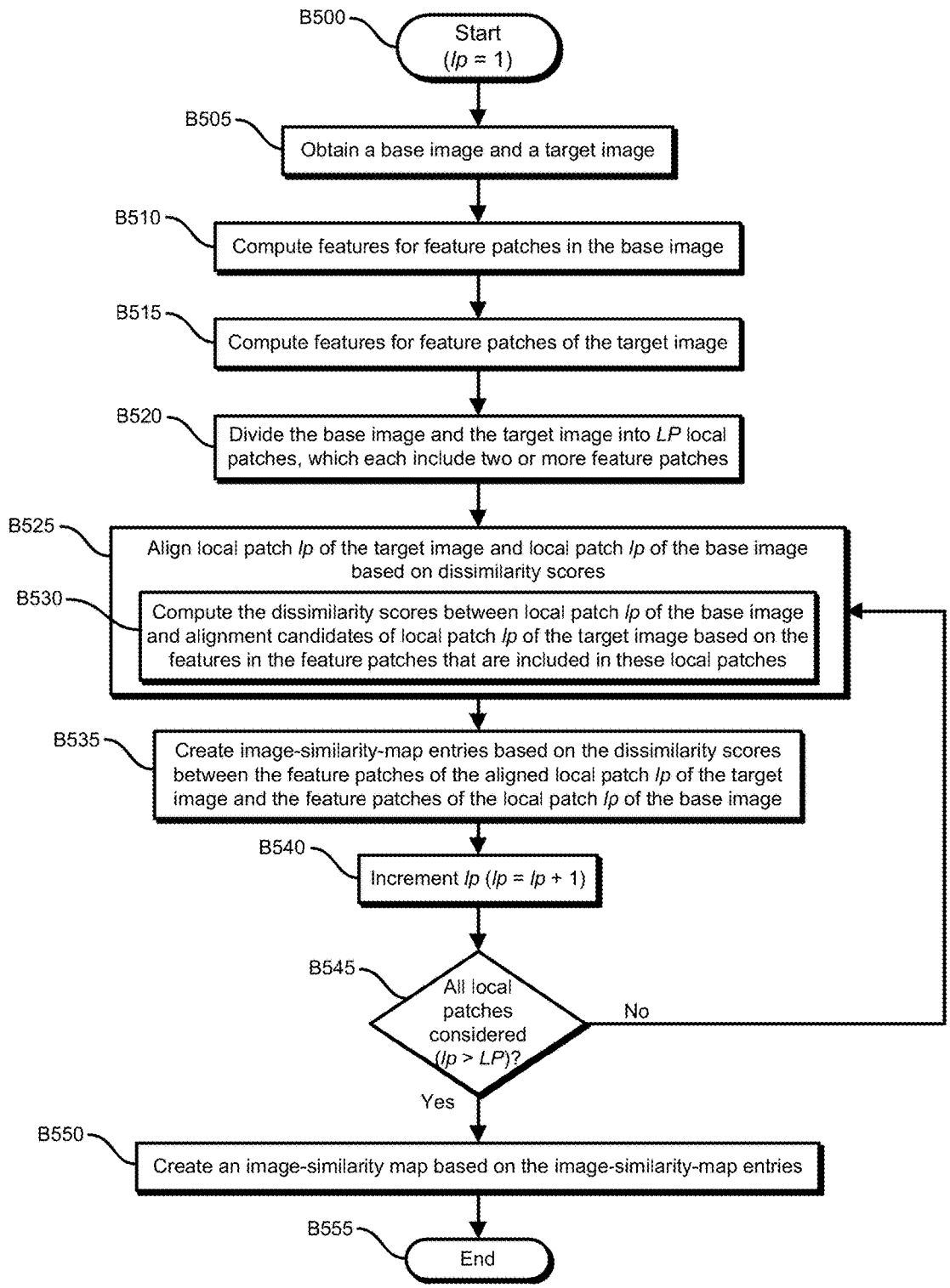
FIG. 5 illustrates an example embodiment of an operational flow for generating an image-similarity map.

The flow then moves to block B330, where the detection device generates a training-image-similarity map based on the revised prime image and on the revised training image $RTI_t$, for example as described in FIG. 5. Next, in block B335, the detection device determines if a respective training-image-similarity map has been generated for every training image (T is the number of training images). If not (B335=No), then the flow proceeds to block B340, where the detection device increases t by one, and then the flow returns to block B315. If yes (B335=Yes), then the flow moves to block B345.

In block B345, the detection device generates an image-similarity-map matrix (ISMM) for the prime image based on the training-image-similarity maps. For example, the image-similarity-map matrix (ISMM) may be a three-dimensional matrix that contains each of the training-image-similarity maps, and, if the dimensions of the training-image-similarity maps are W×H, then the dimensions of the prime-image-similarity-map matrix (ISMM) would be W×H×T, where T is the number of training images.

The flow then moves to block B350, where the detection device generates a normal-similarity-score map (NSSM) for the prime image based on the image-similarity-map matrix (ISMM) for the prime image. For example, in some embodiments, the normal-similarity-score map (NSSM) is a two-dimensional matrix of W×H size.

Each element in the normal-similarity-score map (NSSM) describes a respective feature-patch score that represents the normal variation for that particular feature patch in the images. The detection device may compute the normal-similarity-score map (NSSM) as follows: For all feature patches of the ISMM in position (i,j) (i.e., at ISMM(i,j,*), which translates into a vector of size T, where T is the number of training images), use median absolute deviation (MAD) to compute the normal similarity score (NSS) from the elements in the vector V(i,j,n)=ISMM(i,j,*):

$$MAD(i,j)=median_n(|V(i,j,n)-n)|).$$

Also, $$NSSM(i,j)=median_n(V(i,j,n))+MAD(i,j)*sThreshold,$$

where sThreshold is a configured parameter to adjust the defect detection sensitivity, and where n is the number of feature patches at position (i,j). However, some embodiments of the detection device use one or more other measures, for example standard deviation and average absolute deviation. Also, some embodiments of the detection device create a NSSM that includes two-dimensional entries. For example, some embodiments of the detection device compute and store the following at entry (i,j):

$$M(i,j)=M(i,j) \text{ and } MAD(i,j),$$

where $$M(i,j)=median_n(V(i,j,n)),$$

and where M(i,j) is the entry of the NSSM at (i,j). Thus, in these embodiments, the normal-similarity-score map (NSSM) is a W×H×2 three-dimensional matrix.

Finally, the flow ends in block B355.

Figure 4:
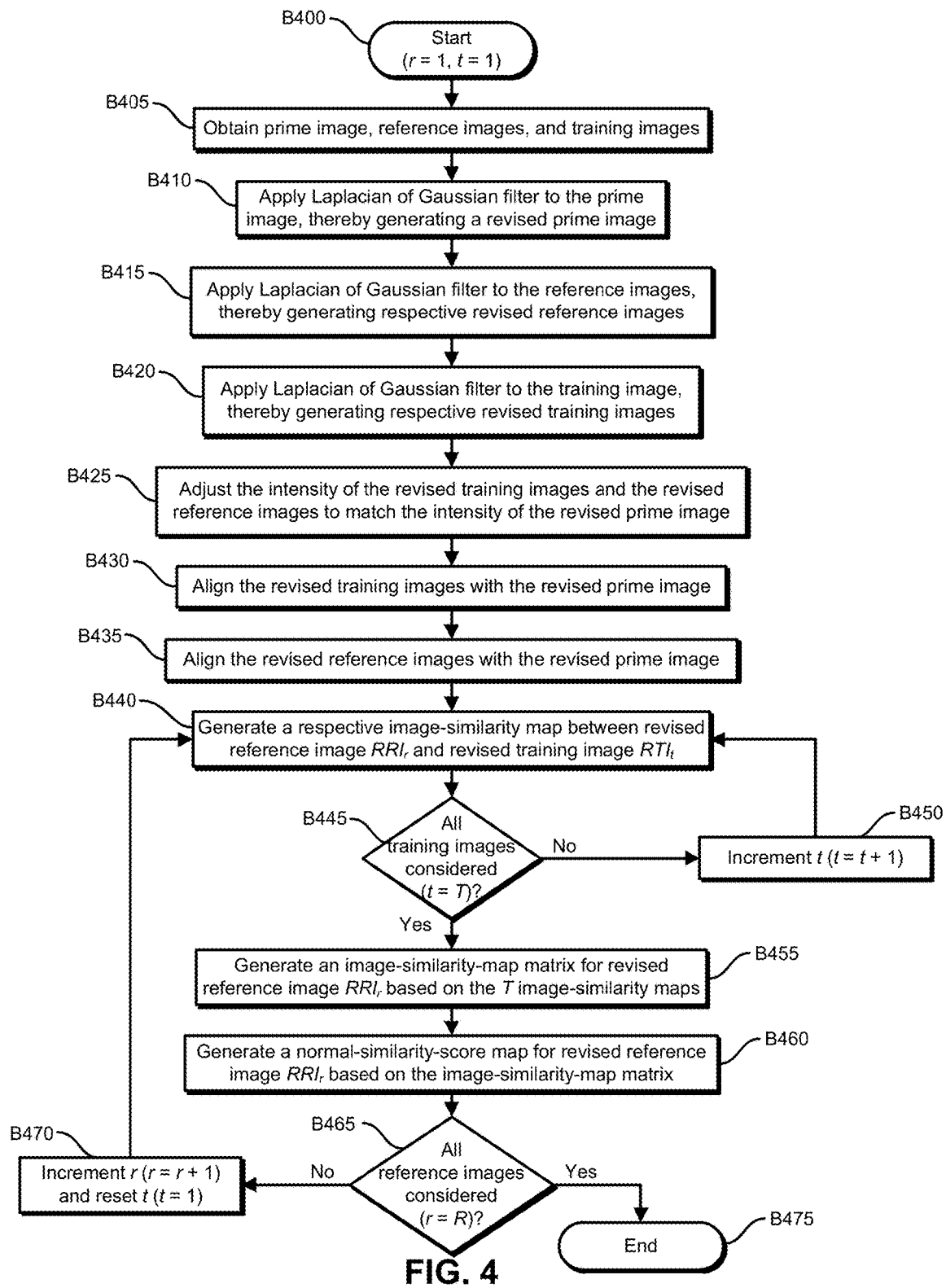
FIG. 4 illustrates an example embodiment of an operational flow for generating a normal-similarity-score map.

FIG. 4 illustrates an example embodiment of an operational flow for generating a normal-similarity-score map. The flow starts in block B400, where a detection device sets r to 1 and sets t to 1. Next, in block B405, the detection device obtains a prime image, reference images, and training images. The flow then moves to block B410, where the detection device enhances the edges of the prime image, thereby generating a revised prime image. The example embodiment of FIG. 4 applies a Laplacian of Gaussian filter to enhance the edges.

Next, in block B415, detection device enhances the edges of the reference images, thereby generating respective revised reference images. The example embodiment of FIG. 4 applies a Laplacian of Gaussian filter to enhance the edges. And in block B420, the detection device enhances the edges of the training images, thereby generating respective revised training images. The example embodiment of FIG. 4 applies a Laplacian of Gaussian filter to enhance the edges.

The flow then proceeds to block B425, where the detection device adjusts the intensities of the revised training images and the revised reference images to match the intensity of the prime image or the revised prime image. To adjust the intensities, some embodiments of the detection device compute the average pixel intensity of a target image (a revised training image or a revised reference image in block B425) and compare it to the average intensity of the prime image or the revised prime image. Then the detection device adjusts all the pixels of the target image by the difference of the two average intensities. Also, some embodiments of the operational flow (e.g., embodiments that use a SIEMD in block B440) omit block B425.

Next, in block B430, the detection device globally aligns the revised training images, which now have adjusted intensities, to the revised prime image. The flow then proceeds to block B435, where the detection device globally aligns the revised reference images, which now have adjusted intensities, to the revised prime image. Thus, the prime image is used as the point of reference for both alignment and intensity.

The flow then moves to block B440, where the detection device generates an image-similarity map based on revised reference image $RRI_r$ and on revised training image $RTI_t$, for example as described in FIG. 5. Next, in block B445, the detection device determines if an image-similarity map has been generated for every training image. If not (B445=No), then the flow moves to block B450, where the detection device increases t by one, and then the flow returns to block B450. If yes (B445=Yes), then the flow proceeds to block B455.

In block B455, the detection device generates an image-similarity-map-matrix (ISSM) for revised reference image $RRI_r$ based on the T image-similarity maps that were generated for revised reference image $RRI_r$ during the respective iterations of block B440. Next, in block B460, the detection device generates a normal-similarity-score map (NSSM) for revised reference image $RRI_r$ based on the image-similarity-map-matrix (ISSM), for example as described in block B350 in FIG. 3.

The flow then moves to block B465, where the detection device determines if a normal-similarity-score map (NSSM) has been generated for every reference image. If not (B465=No), then the flow proceeds to block B470, where the detection device increases r by one and resets t to one, and then the flow returns to block B440. If yes (B465=Yes), then the flow ends in block B475.

FIG. 5 illustrates an example embodiment of an operational flow for generating an image-similarity map. The flow starts in block B500, where a detection device sets lp to 1. Next, in block B505, the detection device obtains a base image (a prime image, another reference image) and a target image (a training image, a test image).

Figure 6A:
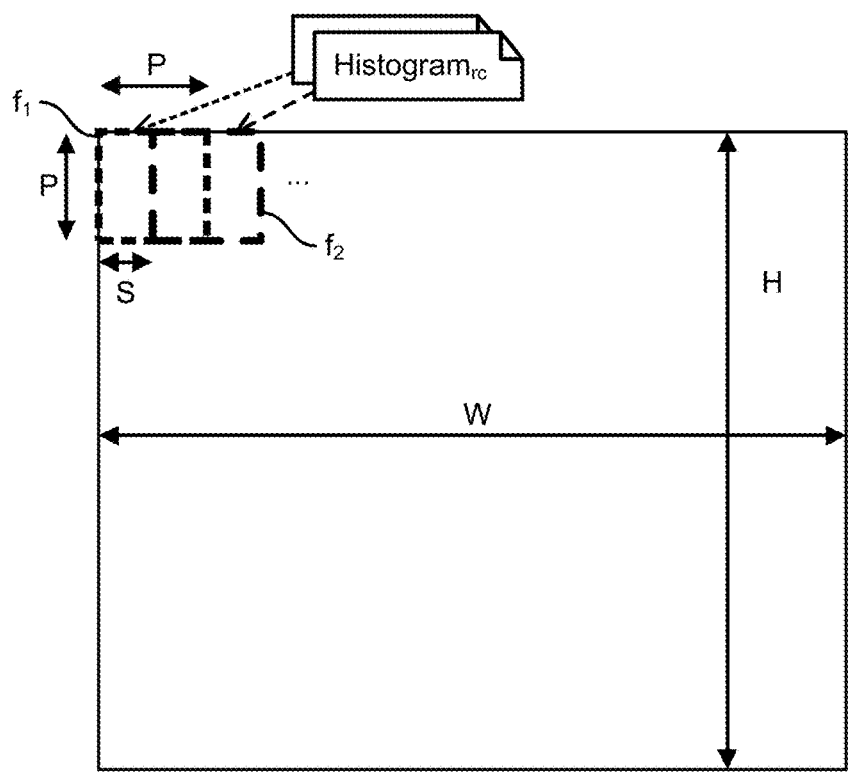
FIG. 6A illustrates an example embodiment of feature patches of an image.

The flow then moves to block B510, where the detection device computes features for feature patches in the base image. In some embodiments, the image feature is the intensity histogram of a feature patch. An intensity histogram is a vector of size M, where each element represents an intensity range. Each element will store the count of the number of pixels that have a respective intensity that falls within the element's intensity range. For example, if the intensity range of an image is 0 to 65535 (e.g., a 16-bit grayscale image), and if M is set to 52, then each element may represent 1285 intensity values (e.g., element 0: 0 to 1284, element 1: 1285 to 2569). Also, each image has N features (histograms), where N may be calculated based on the image size in pixels (W×H) and on a step size (S): N=W/S×H/S. The size of each of the feature patches is P×P, and adjacent patches may overlap if S<P. FIG. 6A illustrates an example embodiment of the feature patches of an image.

The flow then moves to block B515, where the detection device computes features for feature patches of the target image.

Figure 6B:
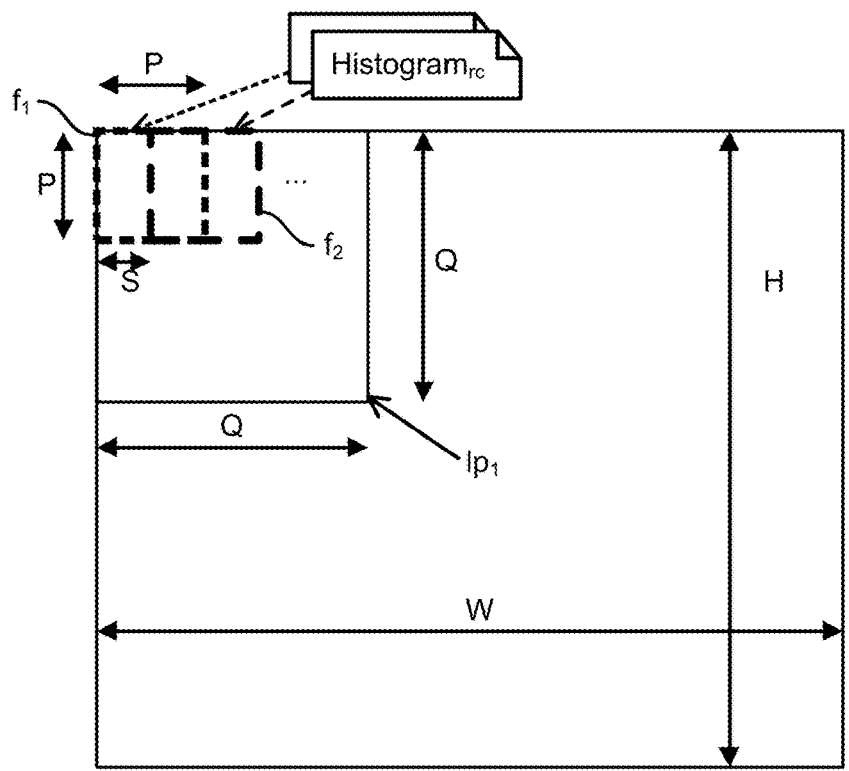
FIG. 6B illustrates an example embodiment of feature patches and a local patch of an image.

Next, in block B520, the detection device divides both the base image and the target image into P local patches, which each includes two or more feature patches. FIG. 6B illustrates an example embodiment of feature patches and a local patch of an image. The size of each of the local patches is Q×Q, where Q>P.

The flow then moves to block B525. In block B525, the detection device aligns local patch lp of the target image with local patch lp of the base image based on dissimilarity scores. Block B525 includes block B530, in which the detection device calculates the dissimilarity scores between local patch lp of the base image and alignment candidates of local patch lp of the target image based on the features in the feature patches that are included in these local patches.

For example, in some embodiments the local alignment includes aligning a local patch of the target image to the corresponding local patch of the base image. Also, these embodiments may use the Earth Mover's Distance (EMD) or a shift-invariant Earth Mover's Distance (SIEMD) as the measure of dissimilarity between two histograms. The EMD is defined as the minimum cost of turning one histogram into the other, where the cost is assumed to be an amount of pixels (represented by a contribution to the histogram counts) moved times the distance (intensity difference) by which the pixels are moved.

For a given local patch $basePatch_{xy}$ of the base image and a local patch $targetPatch_{xy}$ of the target image, the sum of the EMD of their feature histograms may be computed as follows:

$$\text{SumEMD}(xy) = \Sigma \text{EMD}(basePatch_{xy} \text{ feature histogram}_{ij}, targetPatch_{xy} \text{ feature histogram}_{ij}).$$

Also, $targetPatch_{(x\pm a, y\pm b)}$ denotes the following: the local patch of the target image that corresponds to the local patch $basePatch_{xy}$ of the base image and the neighbor patches of the local patch of the target image that corresponds to the local patch $basePatch_{xy}$ of the base image. Also, $0 \le a \le L$, $0 \le b \le L$, where L represents the maximum local shift, and where 0=a and 0=b at the local patch of the target image that corresponds to the local patch $basePatch_{xy}$ of the base image.

For each of the local patches $targetPatch_{(x\pm a, y\pm b)}$ of the target image, the respective sum of the EMD of its feature histograms (compared to $basePatch_{xy}$) is computed, for example as follows:

$$\text{SumEMD}_{(x\pm a, y\pm b)} = \Sigma \text{EMD}(basePatch_{xy} \text{ feature histogram}_{ij}, targetPatch_{(x\pm a, y\pm b)} \text{ feature histogram}_{ij}).$$

Figure 7A:
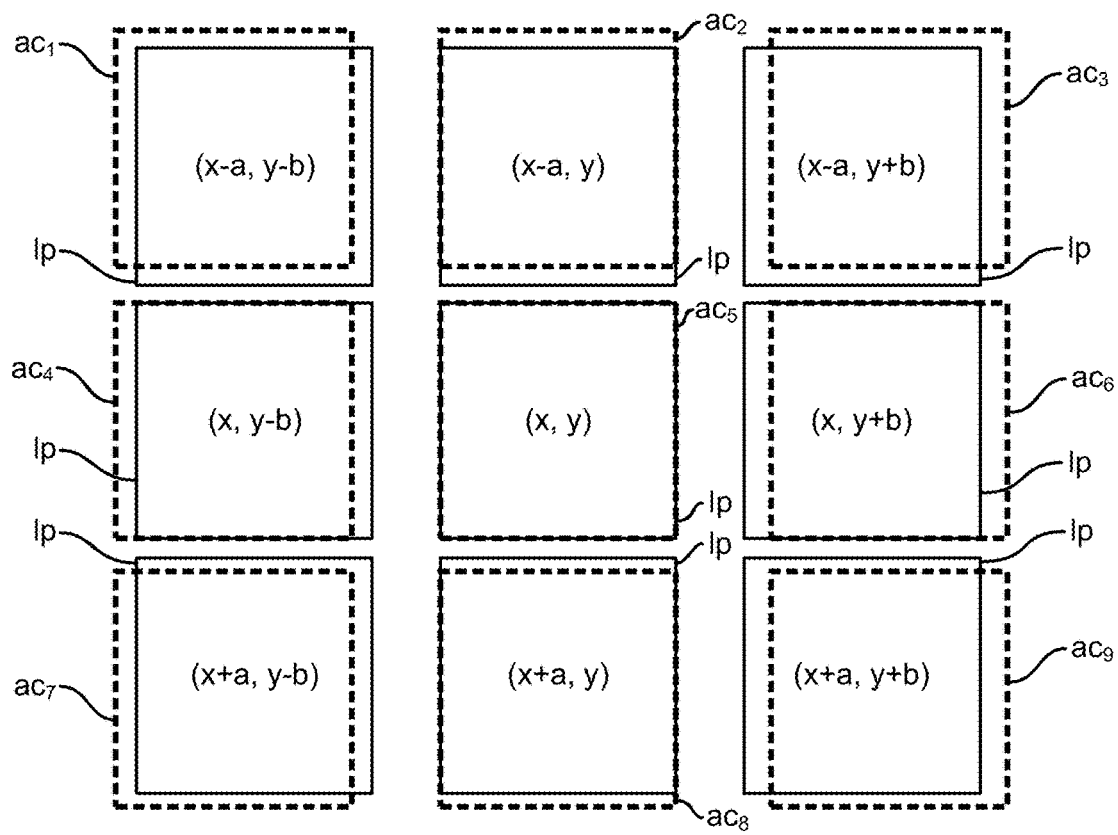
FIG. 7A illustrates an example embodiment of alignment candidates of a local patch.

These local patches $targetPatch_{(x\pm a, y\pm b)}$ of the target image are all alignment candidates of local patch lp of the base image—each alignment candidate may be the local patch that best aligns with local patch lp of the base image. FIG. 7A illustrates an example embodiment of alignment candidates of a local patch. This example, in which a=1 and b=1, has nine alignment candidates.

The $targetPatch_{(x\pm a, y\pm b)}$ that has the lowest $\text{SumEMD}_{(x\pm a, y\pm b)}$ may be considered to be the local patch that best aligns to the $basePatch_{xy}$. Also, the EMD measures from $\text{EMD}(basePatch_{xy}$ feature histogram$_{ij}$, $targetPatch_{(x\pm a, y\pm b)}$ feature histogram$_{ij}$) of the feature patches of the aligned local patch may be used to represent the similarity map entries (i,j) for the feature patches that are included in the local patch (x, y).

For example, some embodiments perform the following:
For each feature patch $patch_{ij}$ in local patch $basePatch_{xy}$, compute the feature patch $patch_{ij}$ intensity histogram ($GH_{ij}$).

Then for each targetPatch$_{cr}$ (N×N in size), where x−a<c<x+a, where 0≤a≤L, where y−b<r<y+b, and where 0≤b≤L in the target image, for each feature patch patch$_{ij}$ in local patch targetPatch$_{cr}$, compute the feature patch patch$_{ij}$ intensity histogram (TH$_{ij}$) and compute D$_{ij}$=EMD(GH$_{ij}$,TH$_{ij}$), and finally compute SumD=ΣD$_{ij}$.

Some embodiments of the detection device use the local patch targetPatch$_{cr}$ that has the lowest SumD as the local patch that best aligns to the base patch basePatch$_{xy}$.

Also, in some embodiments, the dissimilarity score is an accumulated distance between local patch lp of the base image and the alignment candidates of local patch lp of the target image. The accumulated distance may be calculated as described in FIG. 28, 32, 33, 34, or 35. Thus, in some embodiments the dissimilarity score is a shift-invariant Earth Mover's Distance (SIEMD).

After blocks B525 and B530, the flow moves to block B535, where the detection device creates image-similarity-map entries based on the dissimilarity scores between the feature patches of the aligned local patch lp of the target image and the feature patches of the local patch lp of the base image. For example, in some embodiments entry ij in the image-similarity map is described according to EMD (basePatch$_{xy}$ feature histogram$_{ij}$,targetPatch$_{xy}$ feature histogram$_{ij}$), and in some embodiments entry ij in the image-similarity map is described according to SIEMD (basePatch$_{xy}$ feature histogram$_{ij}$,targetPatch$_{xy}$ feature histogram$_{ij}$). Thus, if local patch lp includes ten feature patches, then block B535 may generate ten image-similarity-map entries, one per feature patch.

Next, in block B540, the detection device increases lp by one. The flow then moves to block B545, where the detection device determines if all local patches have been considered (lp>LP), where LP is the total number of local patches. If not (B545=No), then the flow returns to block B525.

If yes (B545=Yes), then the flow proceeds to block B550, where the detection device creates an image-similarity map based on the image-similarity-map entries. In some embodiments, the image-similarity map (ISM) is a two-dimensional matrix of size W$_{ISM}$×H$_{ISM}$, where W$_{ISM}$=W/S and H$_{ISM}$=H/S, with S defined as the step size used during feature generation in blocks B510 and B515. Also, the image-similarity map (ISM) may have one entry per feature patch.

Figure 7B:
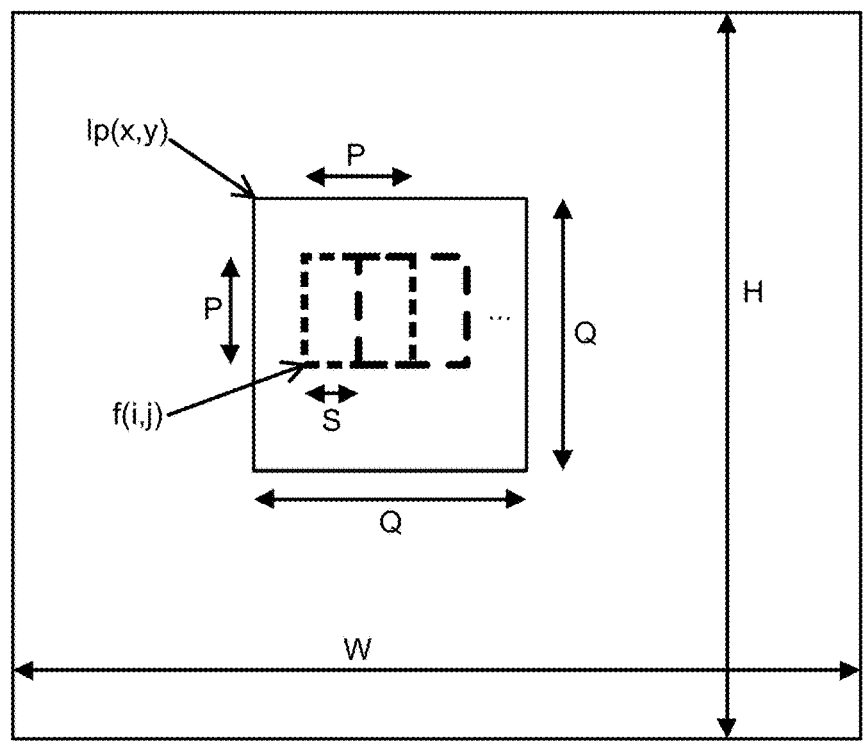
FIG. 7B illustrates an example embodiment of a feature patch of an aligned local patch.

In some embodiments, the image similarity map (ISM) contains the EMDs or the SIEMDs from the aligned local patches that were computed during the local alignment operations. For example, the EMD measure from EMD (basePatch$_{xy}$,feature histogram$_{ij}$,targetPatch$_{(x±a,y±b)}$feature histogram$_{ij}$) of a feature patch (i,j) of an aligned local patch can be used as one of the similarity-map entries for the aligned local patch (x,y). Thus, in some embodiments, ISM$_{(x±i,y±j)}$=EMD(basePatch$_{xy}$,feature histogram$_{ij}$, targetPatch$_{(x±a,y±b)}$,feature histogram$_{ij}$), where a and b are the shift for the aligned local patch. FIG. 7B illustrates an example embodiment of the feature patch (i,j) of an aligned local patch (x,y).

After the detection device creates the image-similarity map in block B550, the flow ends in block B555.

FIG. 6A, as noted above, illustrates an example embodiment of the feature patches of an image. The size of the image in pixels is W×H. The image has been divided into feature patches (two of which, f$_1$ and f$_2$, are shown), and the size of each of the feature patches is P×P. Also, in this embodiment, a feature is the histogram of a respective feature patch. Additionally, the features patches are offset by a step size S, and in FIG. 6A the adjacent feature patches overlap because S<P.

FIG. 6B, as noted above, illustrates an example embodiment of feature patches and a local patch of an image. Like FIG. 6A, the size of the image in pixels is W×H. The image has been divided into feature patches (two of which, f$_1$ and f$_2$, are shown), and the size of each of the feature patches is P×P. And in this embodiment, a feature is the histogram of a respective feature patch. Also, like FIG. 6A, the features patches are offset by a step size S, and the adjacent feature patches overlap because S<P. Additionally, FIG. 6B shows local patch lp$_1$, and the size of each of the local patches, including local patch lp$_1$, is Q×Q, where Q>P.

FIG. 7A, as noted above, illustrates an example embodiment of alignment candidates of a local patch. This example has nine alignment candidates ac$_1$-ac$_9$ of the local patch lp.

FIG. 7B, as noted above, illustrates an example embodiment of a feature patch f(i,j) of an aligned local patch lp(x,y). The size of the image in pixels is W×H. The image has been divided into feature patches (two of which are shown), and the size of each of the feature patches is P×P. Also, the features patches are offset by a step size S, and the adjacent feature patches overlap because S<P. Additionally, FIG. 7B shows local patch lp(x, y), and the size of each of the local patches, including local patch lp(x, y), is Q×Q, where Q>P.

Figure 8A:
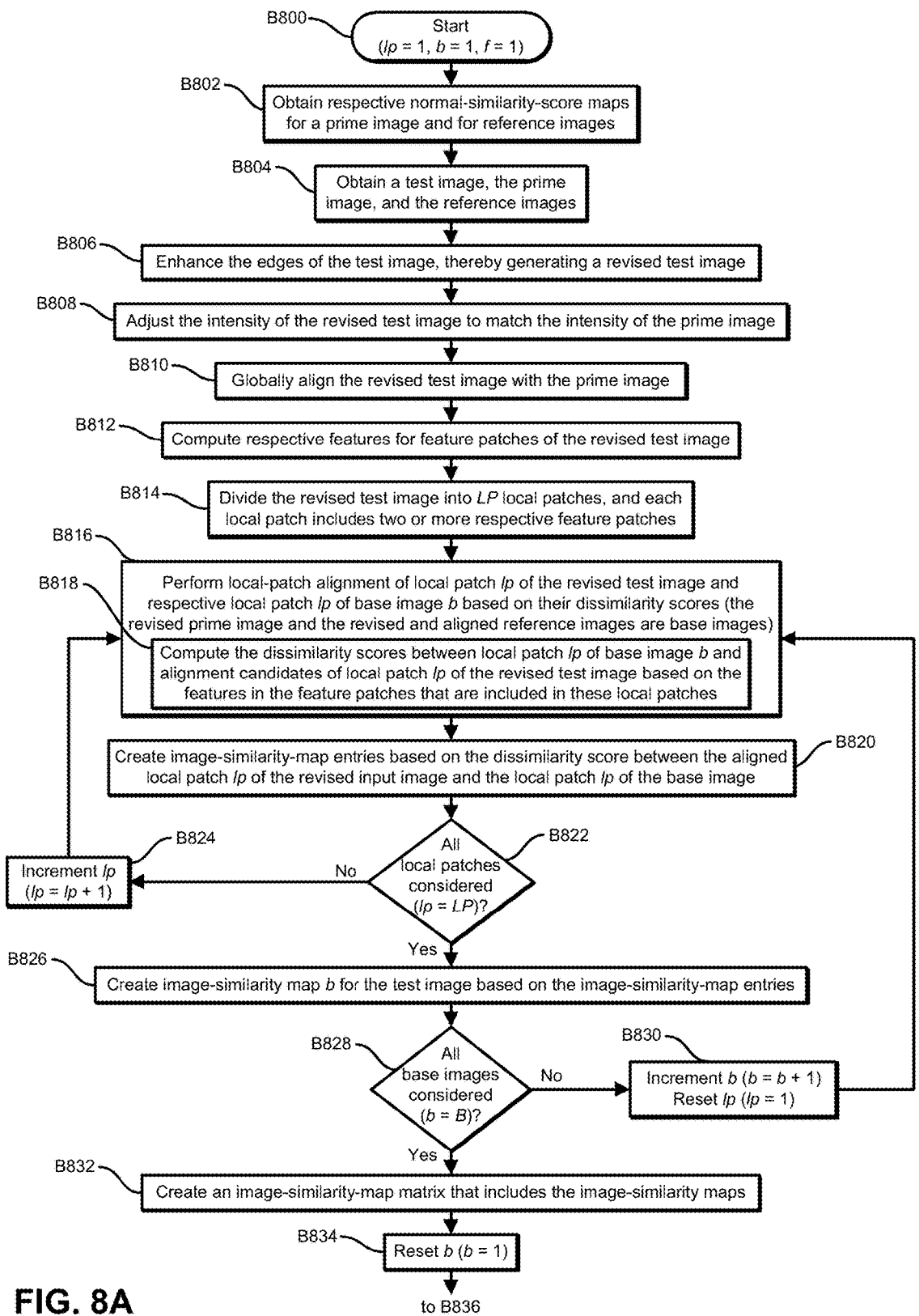
FIGS. 8A and 8B illustrate an example embodiment of an operational flow for anomaly detection.
Figure 8B:
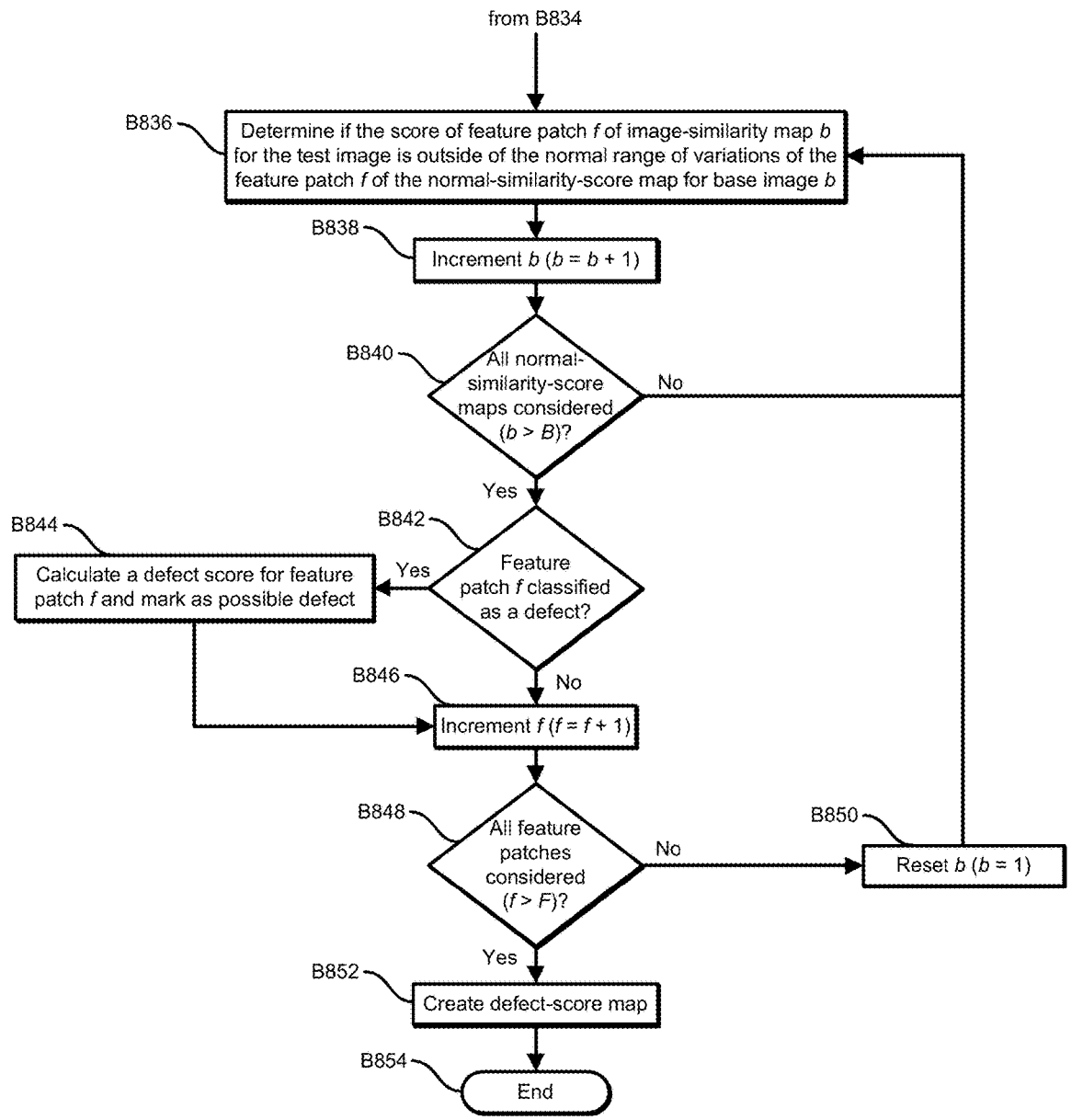

FIGS. 8A and 8B illustrate an example embodiment of an operational flow for anomaly detection. The flow starts in block B800, where a detection device sets lp to 1, sets b to 1, and sets f to 1. Next, in block B802, the detection device obtains respective normal-similarity-score maps for a prime image and for one or more reference images. The normal-similarity-score map for the prime image may be generated as described in FIG. 3, and thus some embodiments of the operational flow in FIGS. 8A and 8B include the operations in FIG. 3. Also, the normal-similarity-score maps for the reference images may be generated as described in FIG. 4, and thus some embodiments of the operational flow in FIGS. 8A and 8B include the operations in FIG. 4.

Next, in block B804, the detection device obtains a test image; the prime image, which may be revised (e.g., as described in block B310 in FIG. 3); and the reference images, which may be revised and aligned (e.g., as described in blocks B415, B425, and B435 in FIG. 4). The test image is an image that will be evaluated for anomalies. The flow then moves to block B806, where the detection device enhances the edges of the test image (e.g., by applying a Laplacian of Gaussian filter), thereby generating a revised test image. Also, in block B808, the detection device adjusts the intensity of the revised test image to match the intensity of the prime image. Also, some embodiments of the operational flow (e.g., embodiments that use a SIEMD in block B816) omit block B808. The flow then moves to block B810, where the detection device globally aligns the revised test image, which has an adjusted intensity in embodiments that include block B808, with the prime image. The flow proceeds to block B812, where the detection device computes respective features for features patches of the revised and aligned test image. In block B814, the detection device divides the revised test image divided into LP local patches, and each local patch includes two or more respective feature patches.

Next, in block B816, the detection device aligns local patch lp of the revised test image and the corresponding local patch lp of base image b based on their dissimilarity scores (the prime image and the reference images are base images—for example, the prime image may be base image 1 (b=1)). Block B816 includes block B818. In block B818, the detection device calculates the dissimilarity scores between local patch lp of base image b and alignment candidates of local patch lp of the revised test image based on the features in the feature patches that are included in these local patches. This includes calculating respective dissimilarity scores between each feature patch in local patch lp of base image b and the corresponding feature patch in the alignment candidates of local patch lp. Thus, if local patch lp of the base image and the alignment candidates of local patch lp each have ten feature patches, and if there are five alignment candidates, then the detection device will calculate fifty dissimilarity scores (ten per alignment candidate). In some embodiments, the dissimilarity score is an EMD. Also, in some embodiments, the dissimilarity score is based on an accumulated distance that was calculated as described in FIG. 28, 32, 33, 34, or 35. Thus, in some embodiments the EMD is a shift-invariant Earth Mover's Distance (SIEMD).

After blocks B816 and B818, the flow moves to block B820, where the detection device creates image-similarity-map entries based on the dissimilarity scores between the feature patches of the aligned local patch lp of the revised test image and the feature patches of the local patch lp of base image b. Next, in block B822, the detection device determines if all local patches have been considered (LP is the total number of local patches.). If not (B822=No), then the flow moves to block B824, where the detection device increases lp by one, and then the flow returns to block B818. If yes (B822=Yes), then the flow moves to block B826, where the detection device generates an image-similarity map b for the test image based on the image-similarity-map entries.

The flow then proceeds to block B828, where the detection device determines if all base images have been considered (B is the total number of base images.). If not (B828=No), then the flow moves to block B830, where the detection device increases b by one and resets lp to one, and then the flow returns to block B816. If yes (B828=Yes), then the flow moves to block B832, where the detection device generates an image-similarity-map matrix that includes the image-similarity maps that were created in block B826 (the image-similarity-map matrix thus includes B image-similarity maps). Next, in block B834, the detection device resets b to one.

The flow then moves to block B836, where the detection device determines if the score of feature patch f of image-similarity map b (which is included in the image-similarity-map matrix) for the test image is outside of the normal range of variations of feature patch (i,j) that are captured by the normal-similarity-score map for base image b. For example, in some embodiments the detection device determines that the score of feature patch f of image-similarity map b for the test image is outside of the normal range of variations if the score of feature patch f of image-similarity map b for the test image is greater than the score of feature patch f of the normal-similarity-score map for base image b (which was obtained in block B802) by a threshold. Also for example, in some embodiments that have a two-dimensional entry at each feature-patch position (i,j), the detection device determines that the score of feature patch f of image-similarity map b for the test image is outside of the normal range of variations if $$\text{Average}_b(\text{Score}(i,j,b)) > s\text{Threshold},$$

where $$\text{Score}(i,j,b) = (\text{ISMMtest}(i,j,b) - M_b(i,j))/\max(\text{MAD}_b(i,j), \text{MinSD}),$$

where MinSD is a minimum standard deviation, where ISMMtest is the image-similarity-map matrix for the test image, where ISMMtest(i,j,b) is the feature patch at position (i,j) in image-similarity map b in ISMMtest, and where sThreshold is a threshold.

Next, in block B838, the detection device increases b by one. In block B840, the detection device determines if feature patch f has been considered for all normal-similarity-score maps. If not (B840=No), then the flow returns to block B836. If yes (B840=Yes), then the flow moves to block B842, where the detection device classifies feature patch f based as a defect patch based on the results of block B836. For example, in some embodiments the detection device determines if the score of feature patch f for the test image is greater than the respective scores of feature patch f in a predetermined threshold percentage of the normal-similarity-score maps (e.g., 25%, 50%, 75%). Also for example, in some embodiments the detection device determines if the score of feature patch f for the test image is outside of the normal range of variations in more than a predetermined threshold percentage of the normal-similarity-score maps. Additionally, some embodiments of the detection device use a classifier that uses the results of block B836 to classify feature path f as either a defect or not a defect. If feature patch f is not classified as a defect (B842=No), then the flow moves to block B846. If feature patch f is classified as a defect (B842=Yes), then the flow moves to block B844, where the detection device calculates a defect score for feature patch f, and the detection device marks feature patch f as a possible defect. The flow then moves to block B846.

In block B846, the detection device increases f by one. Next, in block B848, the detection device determines if all feature patches have been considered. If not (B848=No), then the flow proceeds to block B850, where the detection device resets b to one, and the flow then returns to block B836. If yes (B848=Yes), then the flow moves to block B852.

Figure 12:
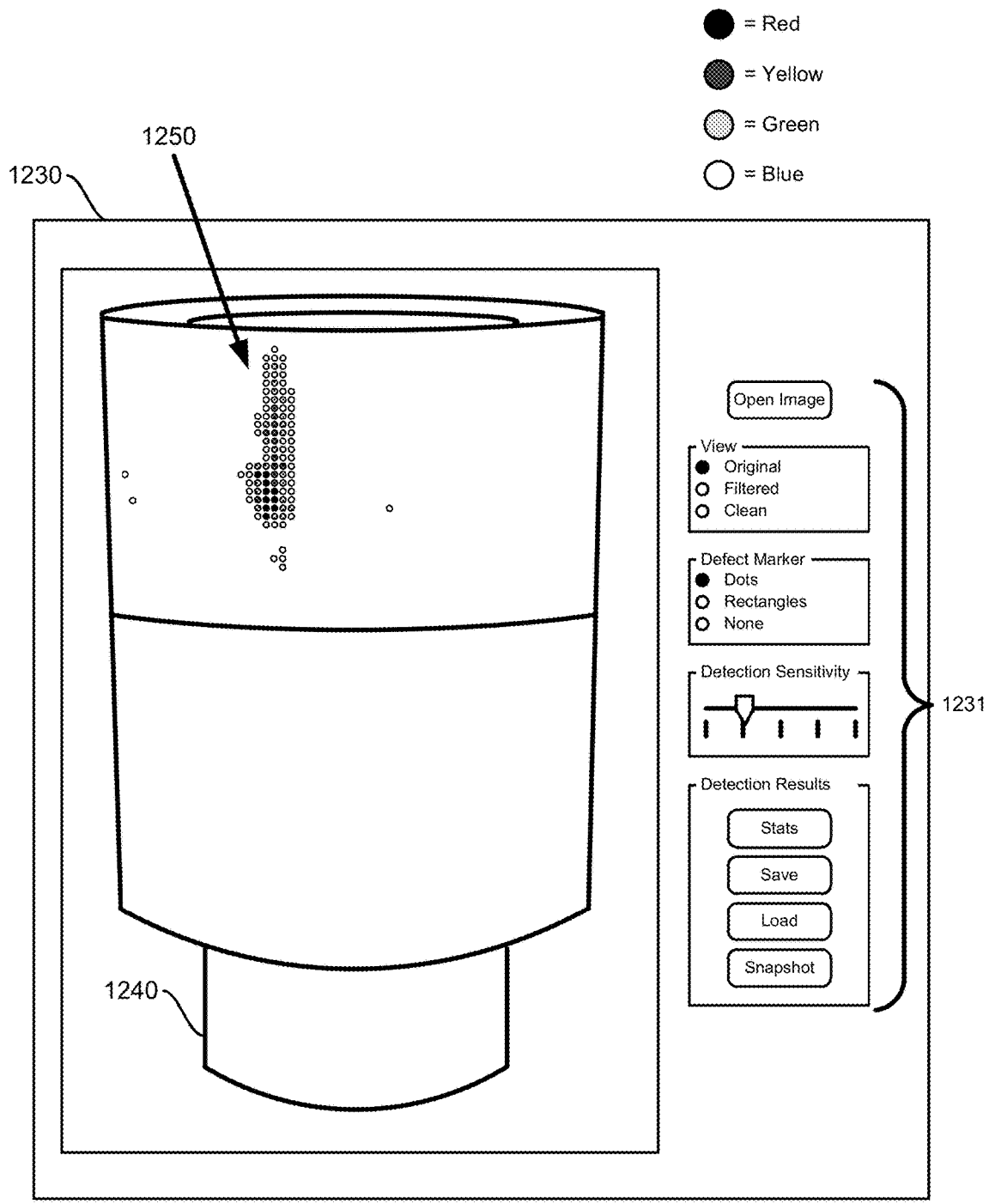
FIG. 12 illustrates an example embodiment of a user interface that displays a defect-score map.
Figure 15:
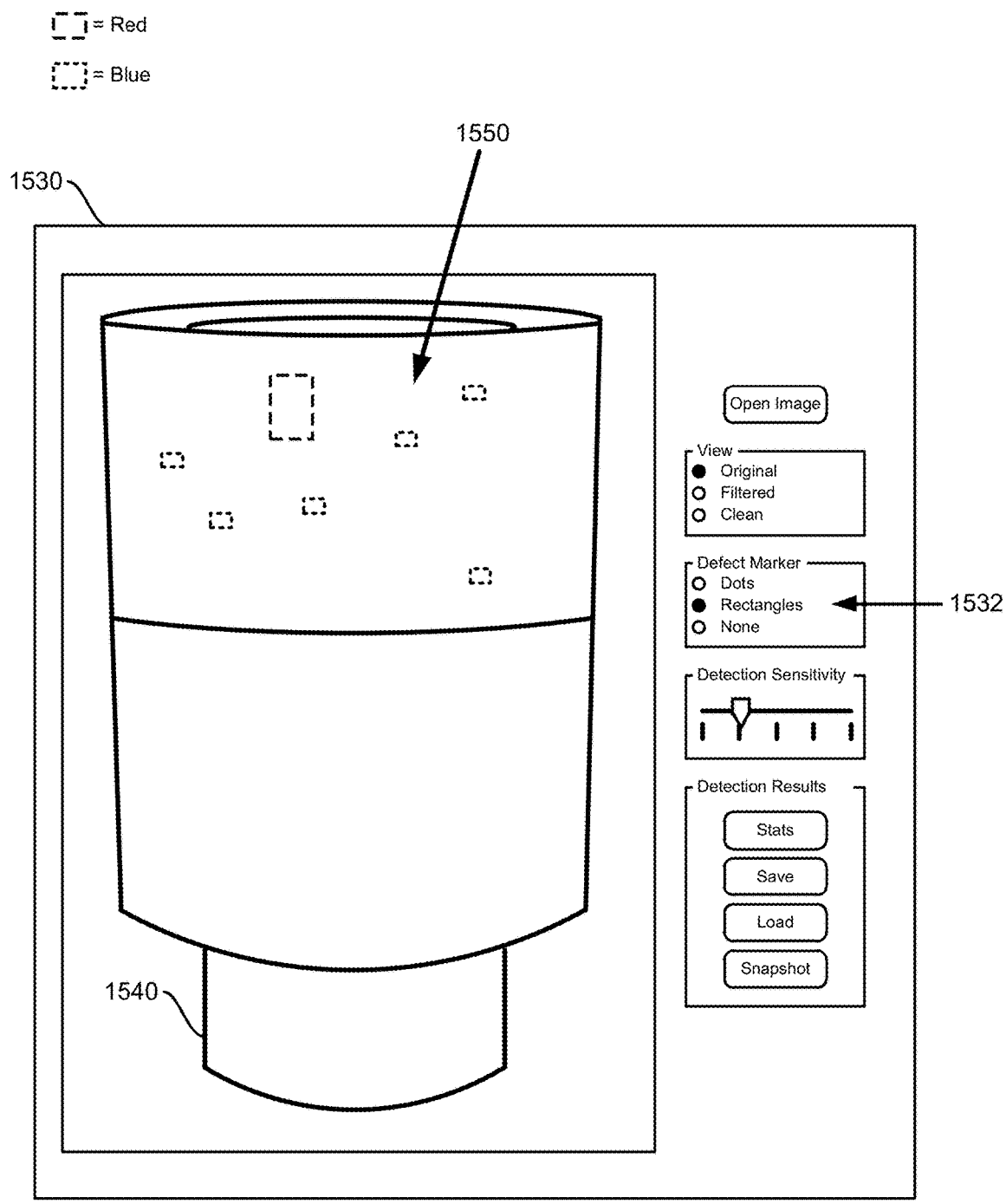
FIG. 15 illustrates an example embodiment of a user interface that displays a defect-score map.

In block B852, the detection device creates a defect-score map (e.g., as shown in FIG. 12 and FIG. 15). For example, some embodiments of the detection device use a color to indicate a defect score at a feature patch according to the following:

Red indicates a high confidence of a defect or a high defect score (>0.75*max score);

Yellow indicates a medium-high confidence of a defect or a medium-high defect score (<0.75*max score AND >0.5*max score).

Green indicates a medium-low confidence of a defect or a medium-low defect score (<0.5*max score AND >0.25*max score).

Blue indicates a low confidence of a defect or a low defect score (<0.25*max score).

The maximum score may be the score for the feature with the highest score obtained during the analysis.

Also for example, some embodiments of the detection device determine the color of a feature patch's entry in the defect-score map based on how far the defect score of the feature patch is from sThreshold. For example, some embodiments determine that the color is blue if the defect score is less than sThreshold+1, determine that the color is green if the defect score is less than sThreshold+2 and greater than sThreshold+1, determine that the color is yellow if the defect score is less than sThreshold+3 and greater than sThreshold+2, and determine that the color is red otherwise.

Then the flow ends in block B854.

Figure 9:
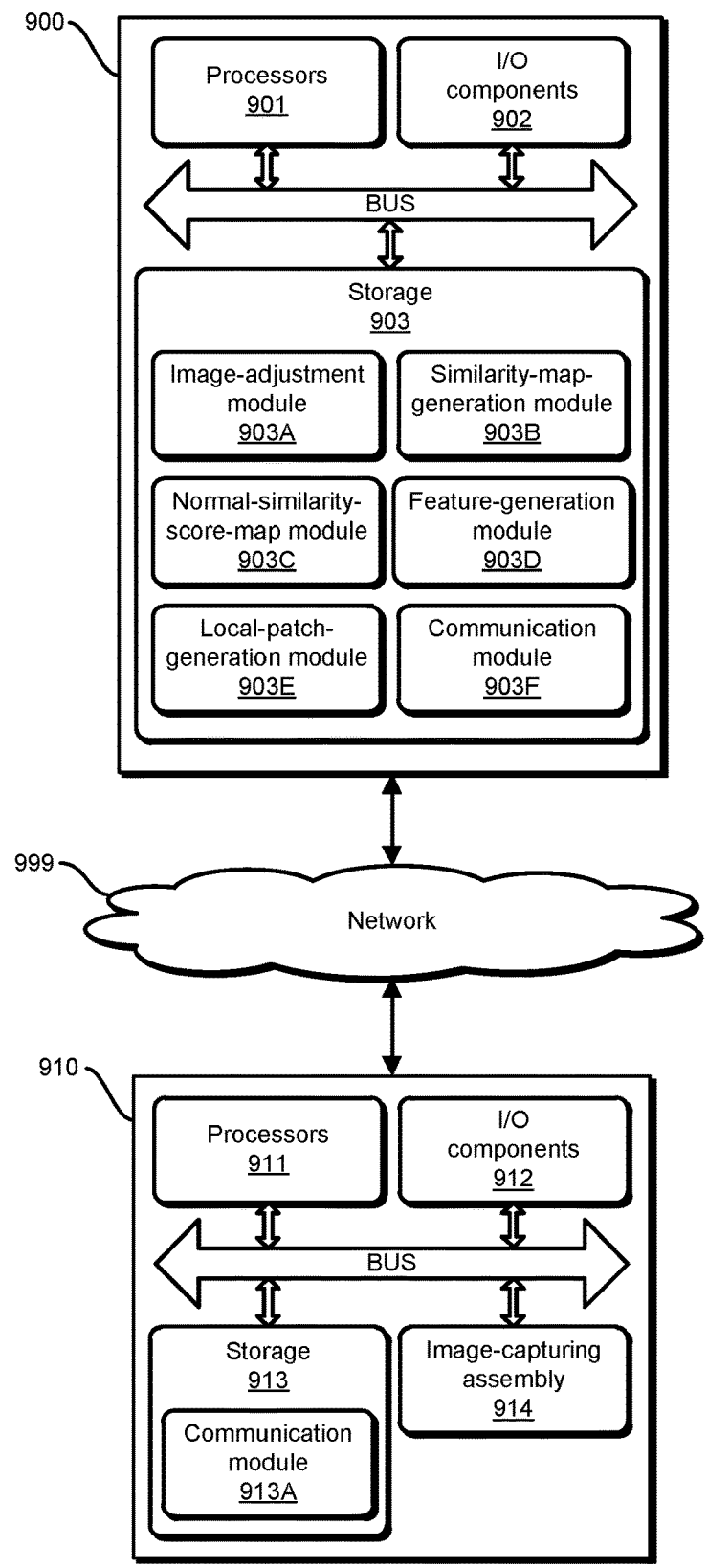
FIG. 9 illustrates an example embodiment of a system for anomaly detection.

FIG. 9 illustrates an example embodiment of a system for anomaly detection. The system includes a detection device 900, which is a specially-configured computing device, and an image-capturing device 910. Some embodiments of the system include one or more additional detection devices 900, one or more additional image-capturing devices 910, or a display device. In this embodiment, the devices communicate by means of one or more networks 999, which may include a wired network, a wireless network, a LAN, a WAN, a MAN, and a PAN. Also, in some embodiments the devices communicate by means of other wired or wireless channels.

The detection device 900 includes one or more processors 901, one or more I/O components 902, and storage 903. Also, the hardware components of the detection device 900 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 901 include one or more central processing units (CPUs), which include microprocessors (e.g., a single core microprocessor, a multi-core microprocessor); one or more graphics processing units (GPUs); one or more application-specific integrated circuits (ASICs); one or more field-programmable-gate arrays (FPGAs); one or more digital signal processors (DSPs); or other electronic circuitry (e.g., other integrated circuits).

The I/O components 902 include communication components (e.g., a GPU, a network-interface controller) that communicate with input and output devices, which may include a keyboard, a display device, a mouse, a printing device, a touch screen, a light pen, an optical-storage device, a scanner, a microphone, a drive, a controller (e.g., a joystick, a control pad), and the network 999.

The storage 903 includes one or more computer-readable storage media. As used herein, a computer-readable storage medium, in contrast to a mere transitory, propagating signal per se, refers to a computer-readable media that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 903, which may include both ROM and RAM, can store computer-readable data or computer-executable instructions.

The detection device 900 also includes an image-adjustment module 903A, a similarity-map-generation module 903B, a normal-similarity-score-map module 903C, a feature-generation module 903D, a local-patch-generation module 903E, and a communication module 903F. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software, the software can be stored in the storage 903.

The image-adjustment module 903A includes instructions that, when executed, or circuits that, when activated, cause the detection device 900 to enhance the edges in one or more images, adjust the intensity of one or more images, and globally align one or more images, for example as described in blocks B305-B325 of FIG. 3, in blocks B410-B435 in FIG. 4, or in blocks B806-B810 in FIG. 8A.

The similarity-map-generation module 903B includes instructions that, when executed, or circuits that, when activated, cause the detection device 900 to generate respective similarity maps for pairs of images, for example as described in blocks B525-B550 in FIG. 5.

The normal-similarity-score-map module 903C includes instructions that, when executed, or circuits that, when activated, cause the detection device 900 to generate a normal-similarity-score map, for example as described in blocks B330-B350 in FIG. 3 or in blocks B440-B460 in FIG. 4.

The feature-generation module 903D includes instructions that, when executed, or circuits that, when activated, cause the detection device 900 to divide an image into feature patches and generate respective features for the feature patches, for example as described in blocks B510-B515 in FIG. 5.

The local-patch-generation module 903E includes instructions that, when executed, or circuits that, when activated, cause the detection device 900 to divide an image into local patches, for example as described in block B520 in FIG. 5.

The communication module 903F includes instructions that, when executed, or circuits that, when activated, cause the detection device 900 to communicate with one or more other devices, for example the image-capturing device 910.

Figure 36:
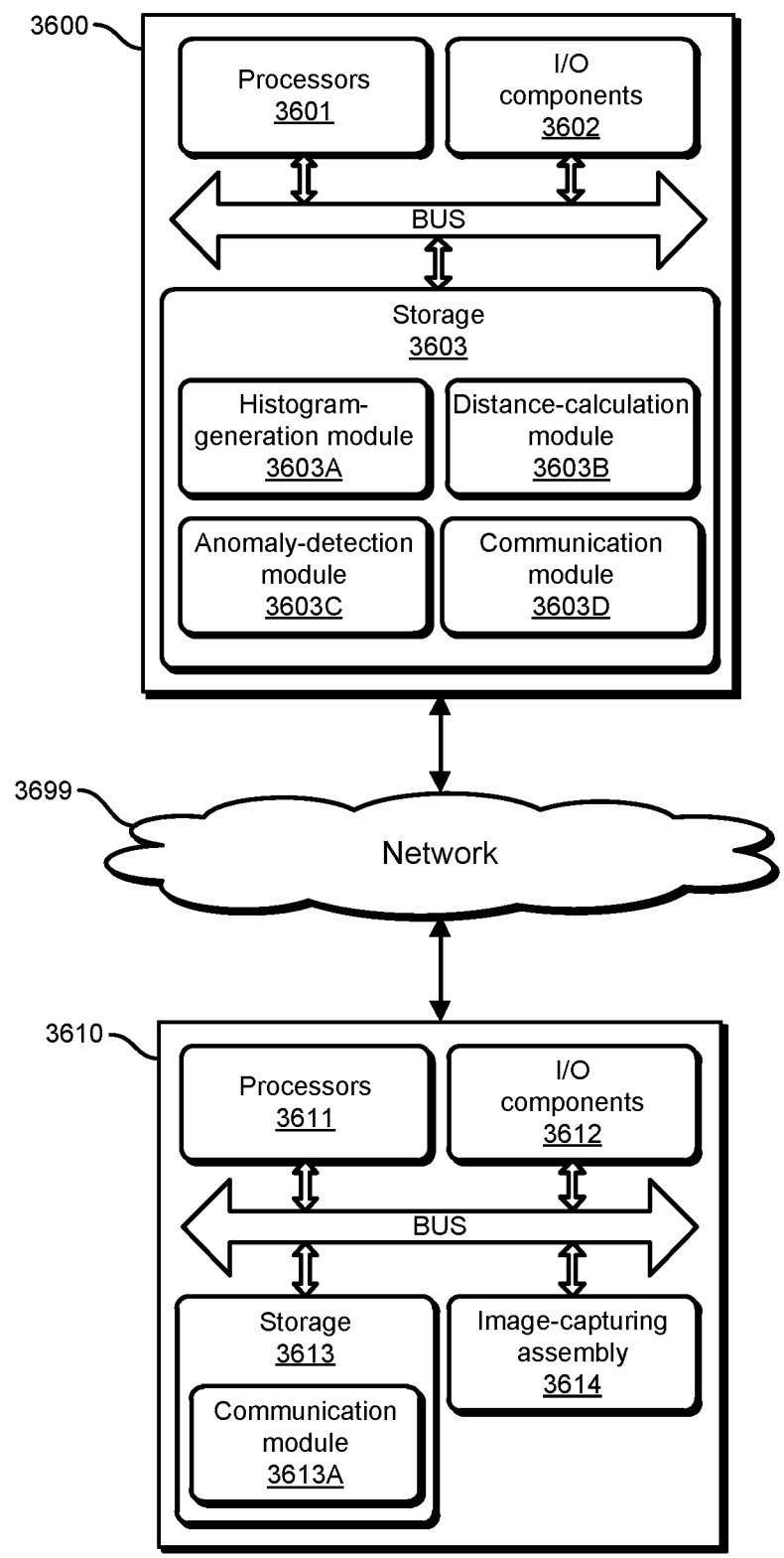
FIG. 36 illustrates an example embodiment of a system for comparing images.

Also, the detection device 900 may include one or more of the histogram-generation module 3603A, the distance-calculation module 3603B, and the anomaly-detection module 3603C in FIG. 36.

The image-capturing device 910 includes one or more processors 911, one or more I/O components 912, storage 913, a communication module 913A, and an image-capturing assembly 914. The image-capturing assembly 914 includes one or more imaging sensors, such as an x-ray sensor. The communication module 913A includes instructions that, when executed, or circuits that, when activated, cause the image-capturing device 910 to receive a request for an image from a requesting device, receive a request to capture an image, retrieve a requested image from the storage 913, send a retrieved image to the requesting device (e.g., the detection device 900), or send a captured image to the requesting device.

Additionally, some embodiments use one or more functional units to implement the above-described devices, systems, and methods. The functional units may be implemented in only hardware (e.g., customized circuitry) or in a combination of software and hardware (e.g., a microprocessor that executes software).

Figure 10:
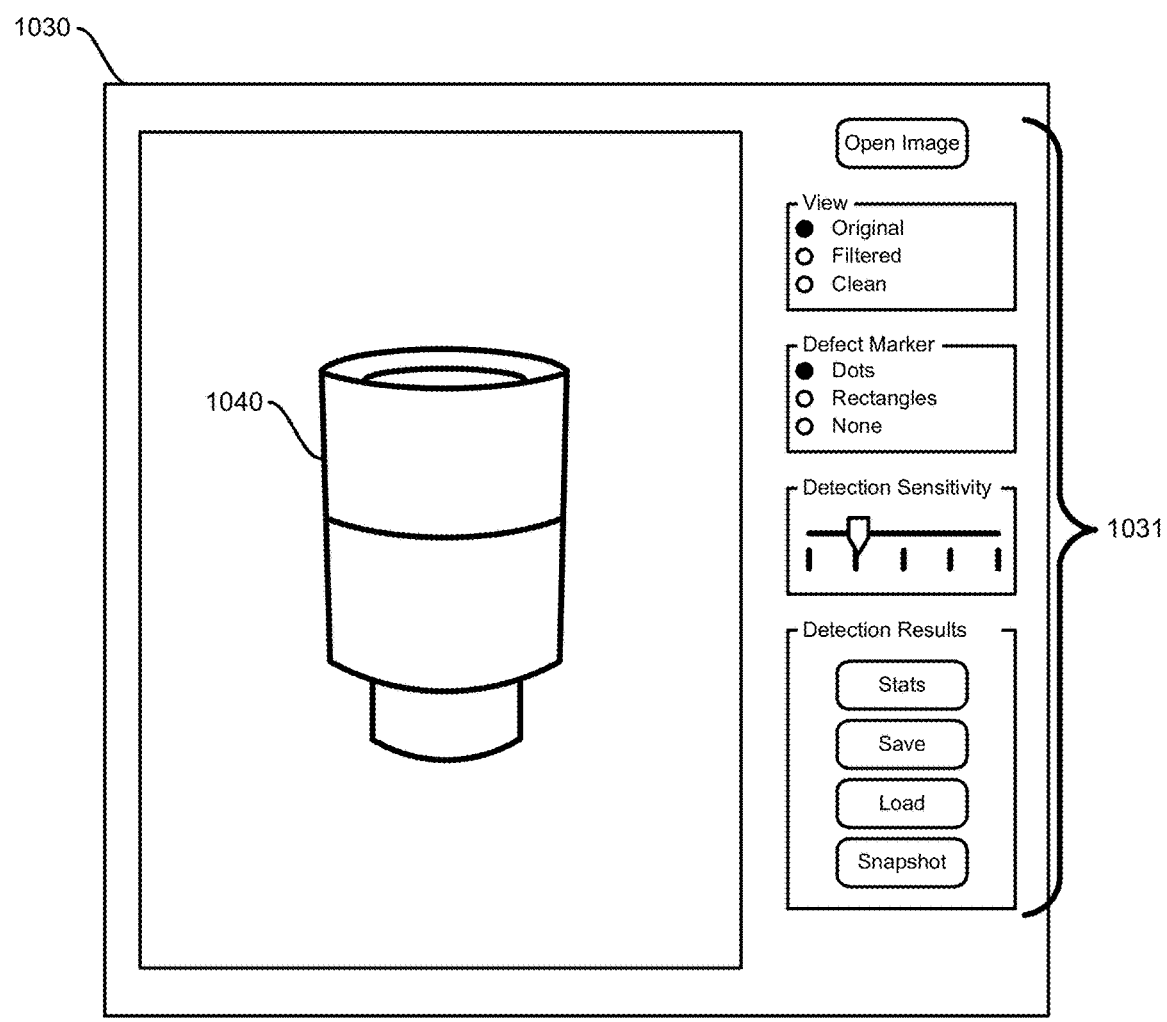
FIG. 10 illustrates an example embodiment of a user interface.

FIG. 10 illustrates an example embodiment of a user interface. The user interface 1030 includes an image of an object 1040 (a coffee mug). The user interface 1030 also includes controls 1031. The controls 1031 allow a user to open an image, change the view, change the defect marker, adjust the detection sensitivity, display detection statistics, save an image, load an image, and take a snapshot of a displayed image.

Figure 11:
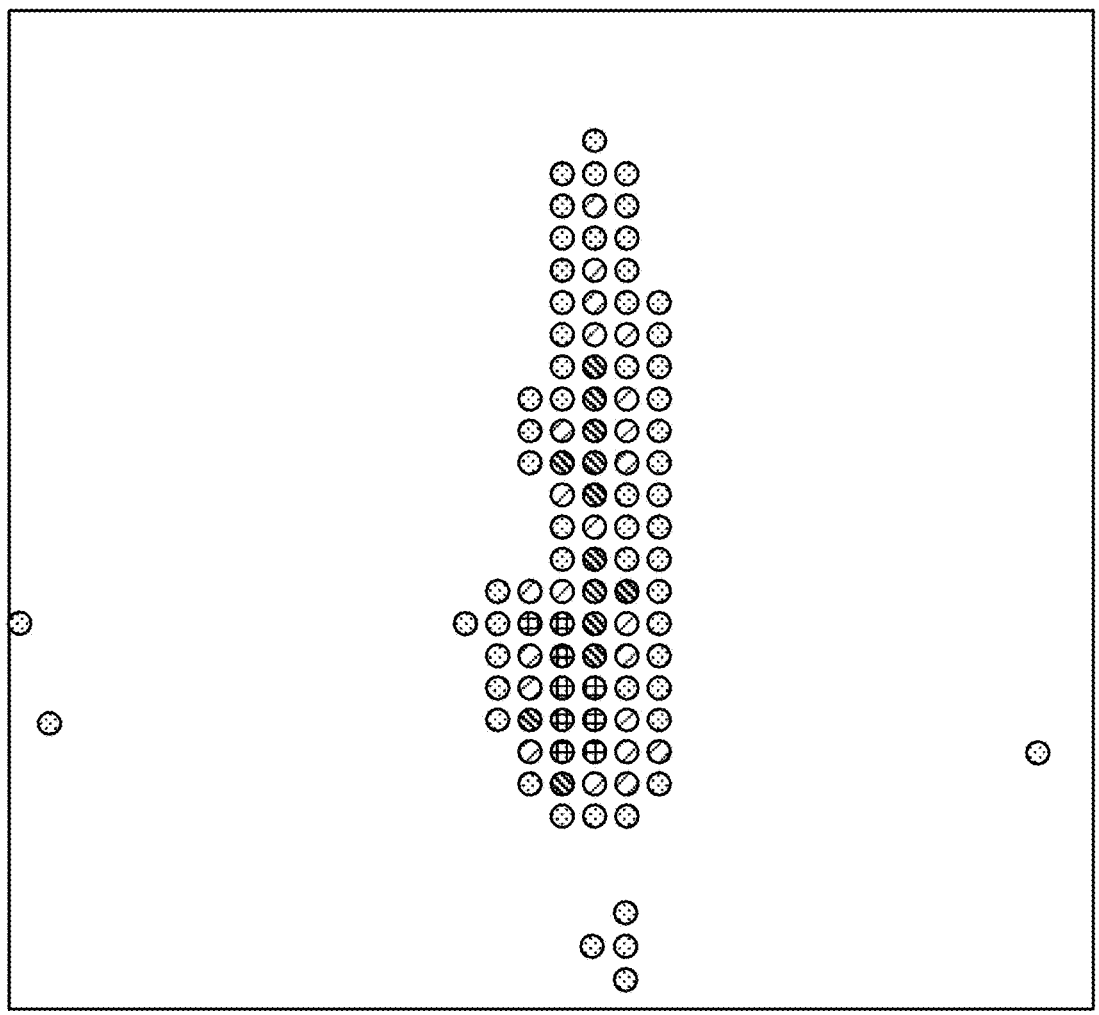
FIG. 11 illustrates an example embodiment of a defect-score map.

FIG. 11 illustrates an example embodiment of a defect-score map. In FIG. 11, red, yellow, green, and blue are each represented by the respective pattern that is shown in the legend. A "red" dot indicates a high confidence or score (>0.75*max score), a "yellow" dot indicates a medium-high confidence or score (<0.75*max score AND>0.5*max score), a "green" dot indicates a medium-low confidence or score (<0.5*max score AND>0.25*max score), and a "blue" dot indicates a low confidence or score (<0.25*max score). The confidence scores indicate a confidence that an anomaly has been identified in an image of an object at the location of the dot in the defect-score map 1150, and the anomaly in the image of the object may indicate a defect in the object.

For example, FIG. 12 illustrates an example embodiment of a user interface that displays a defect-score map. The user interface 1230 includes an image of an object 1240. The user interface 1230 also includes controls 1231. The defect-score map 1250 indicates a confidence that an anomaly has been identified in the image of the object 1240 at the locations that are identified by the defect-score map 1250. In FIG. 12, the defect-score map 1250 indicates that anomalies were detected in the displayed image, which may indicate a defect in the object 1240.

Figure 13:
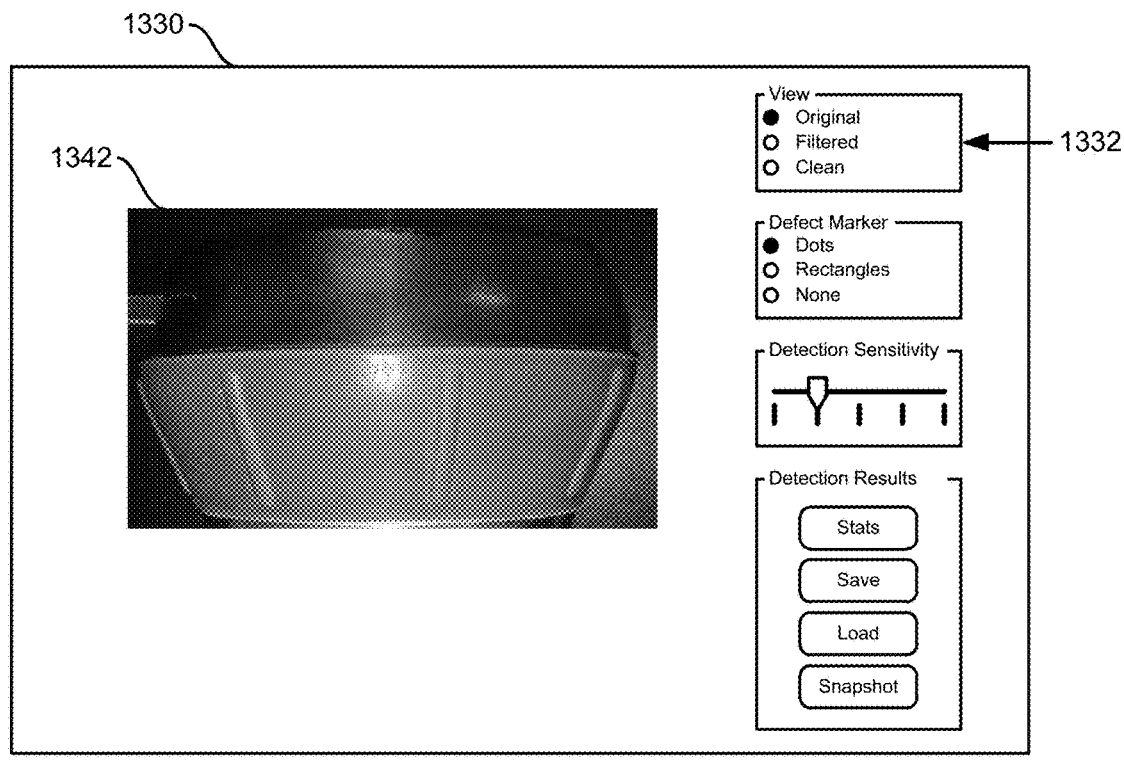
FIG. 13 illustrates an example embodiment of a user interface.

FIG. 13 illustrates an example embodiment of a user interface. Because "Original" is the selected View control 1332 in this example, the user interface 1330 displays the original image 1342 of the object.

Figure 14:
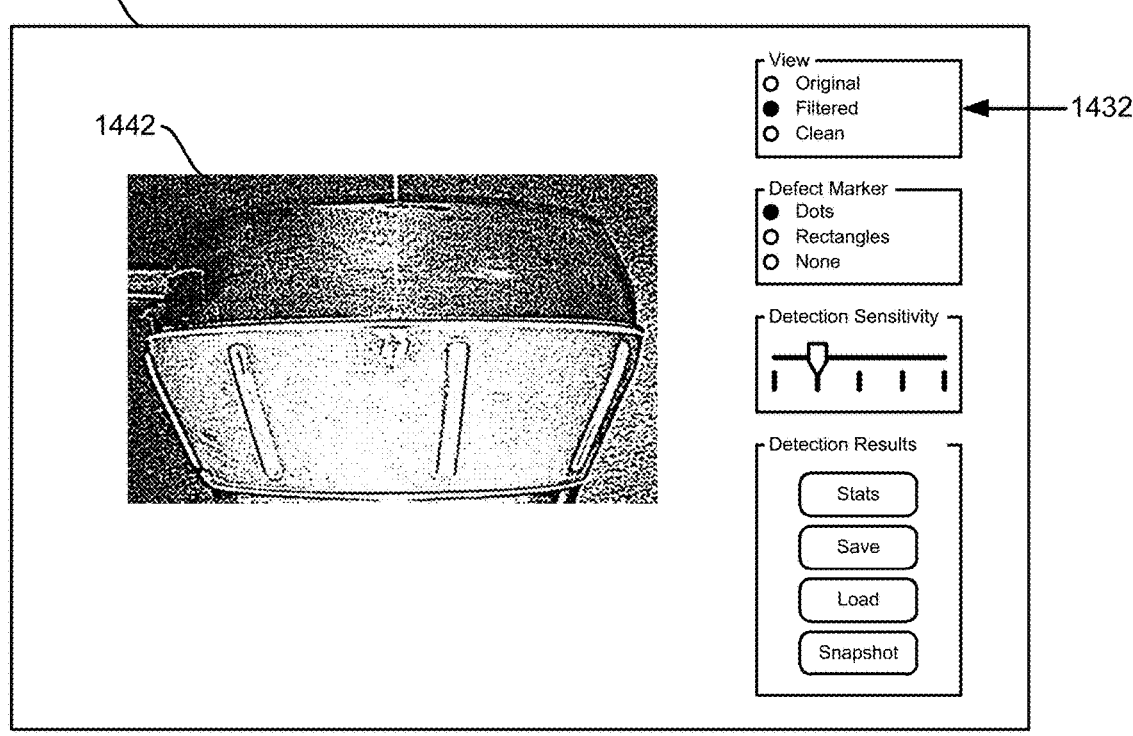
FIG. 14 illustrates an example embodiment of a user interface.

FIG. 14 illustrates an example embodiment of a user interface. Because "Filtered" is the selected View control 1432 in this example, the user interface 1430 displays an edge-enhanced image 1442 of the object that was generated by applying a Laplacian of Gaussian filter to the original image from FIG. 13. In some embodiments of the user interface 1430 that show only one image, a user can toggle the user interface 1430 between a view of an original image (e.g., the original image 1342 in FIG. 13) and a view of an edge-enhanced image (e.g., the edge-enhanced image 1442 in FIG. 14) using the "View" controls 1432 on the right side of the user interface. And some embodiments of the user interface 1430 allow "Original" and "Filtered" to be simultaneously selected, and accordingly these embodiments simultaneously display the original image 1342 of the object and the edge-enhanced image 1442 of the object.

FIG. 15 illustrates an example embodiment of a user interface that displays a defect-score map. In FIG. 15, red and blue are each represented by the respective pattern that is shown in the legend. This embodiment of a defect-score map 1550 identifies detected anomalies, which may be defects in the object 1540, with colored rectangles instead of colored dots. In this example, a "red" rectangle indicates a high confidence, and a "blue" rectangle indicates a low confidence. A user can control the selection of dots or rectangles using the "Defect Marker" control buttons 1532 on the right side of the user interface 1530.

Figure 16:
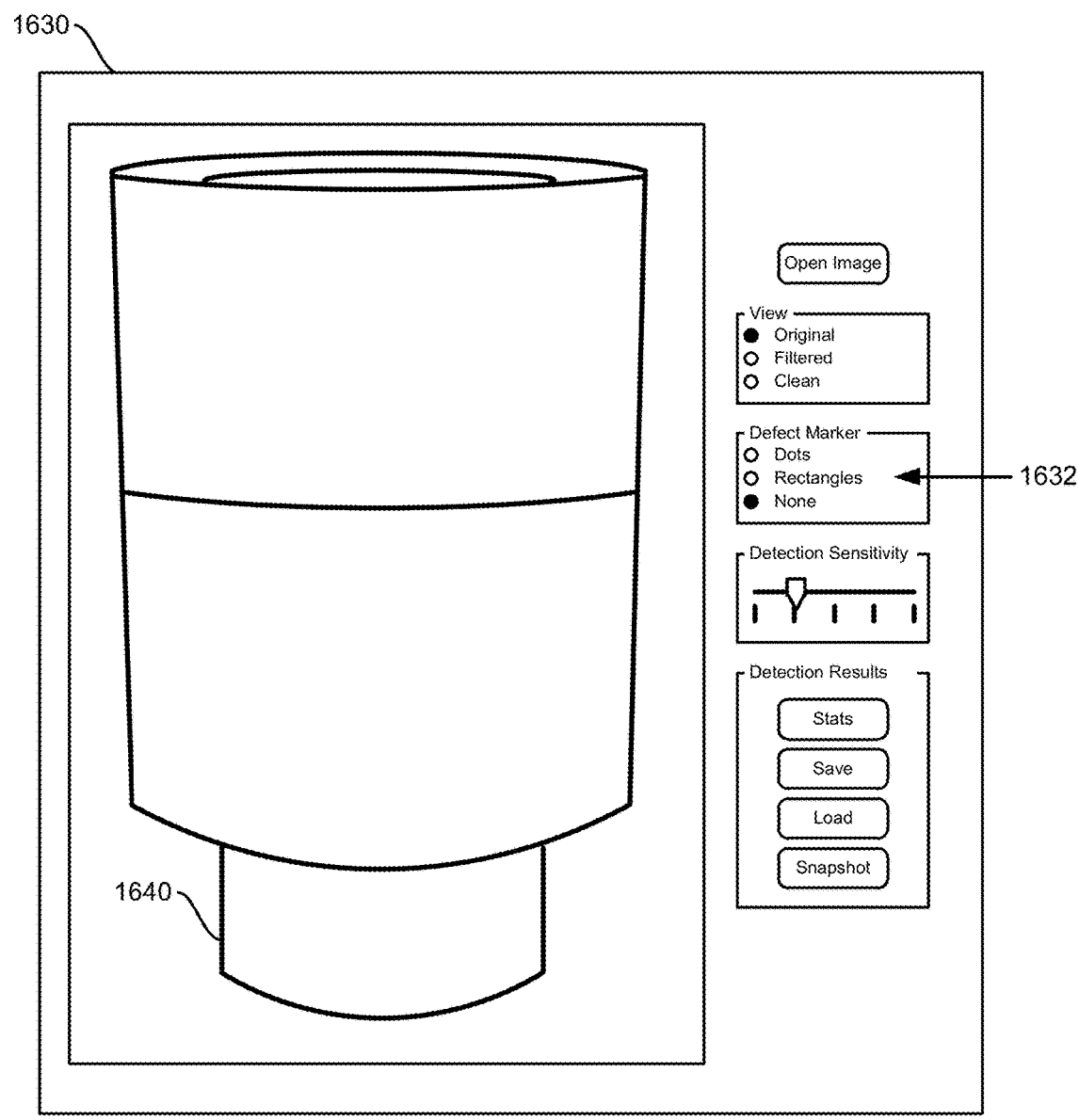
FIG. 16 illustrates an example embodiment of a user interface.

FIG. 16 illustrates an example embodiment of a user interface. In this embodiment of a user interface 1630, the "None" button is the selected "Defect Marker" control button 1632, so the detected anomalies are not indicated in the image of an object 1640.

Figure 17:
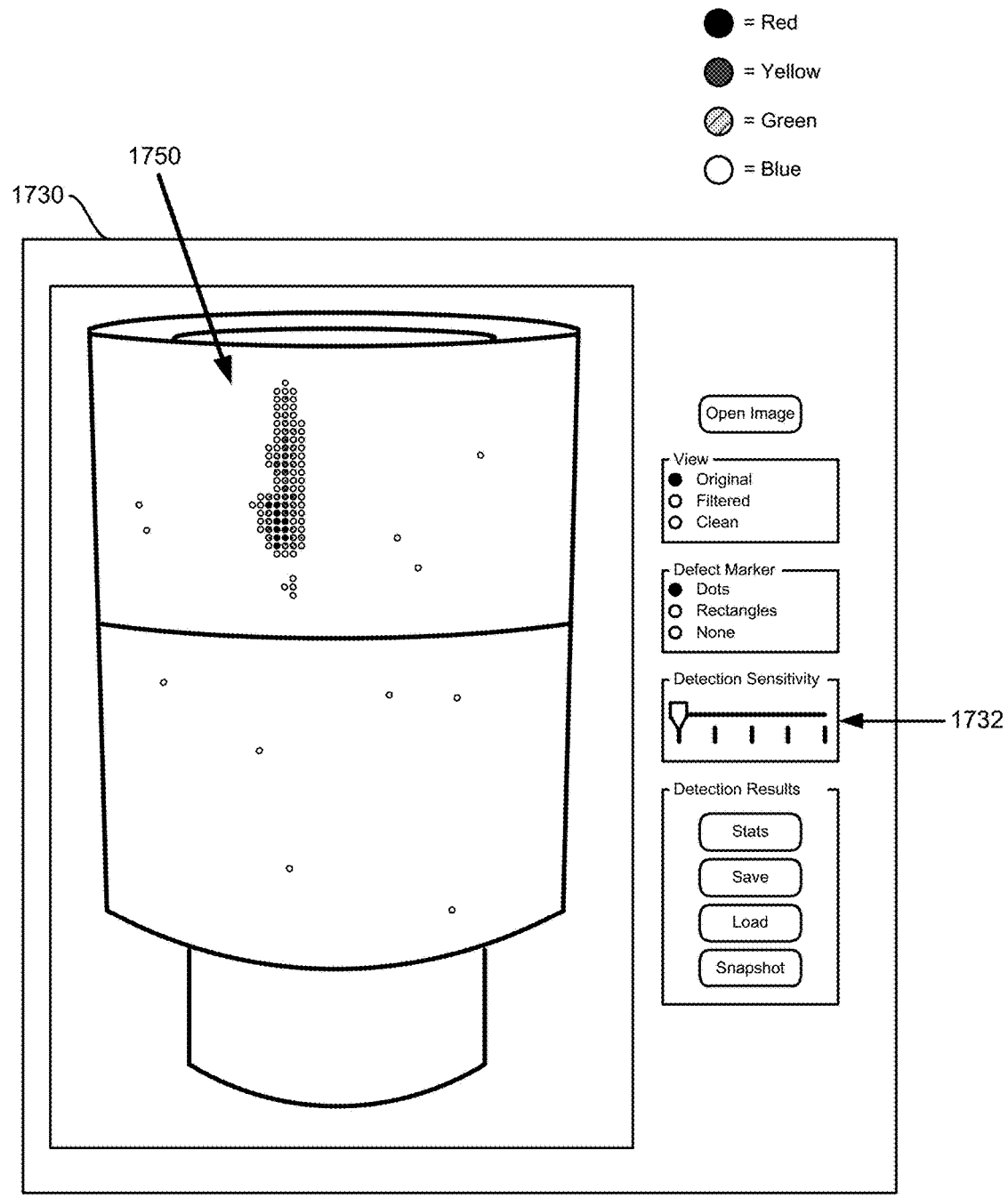
FIG. 17 illustrates an example embodiment of a user interface.

FIG. 17 illustrates an example embodiment of a user interface. This embodiment of a user interface 1730 includes a "Detection Sensitivity" control 1732, which allows a user to adjust the sensitivity of either or both of (1) the anomaly detection (e.g., by adjusting the threshold score difference in block B836 in FIG. 8B, by adjusting the threshold percentage in block B842 in FIG. 8B, by adjusting sThreshold, by adjusting the thresholds of soft classifiers in block B842) and (2) the confidence level of displayed anomalies (a greater sensitivity causes anomalies that have lower confidence levels to be displayed). In FIG. 17, the Detection Sensitivity control 1732 is a slider and is set to the most-sensitive setting. Accordingly, the user interface 1730 displays a defect-score map 1750 that marks many anomalies, which indicate possible defects.

Figure 18:
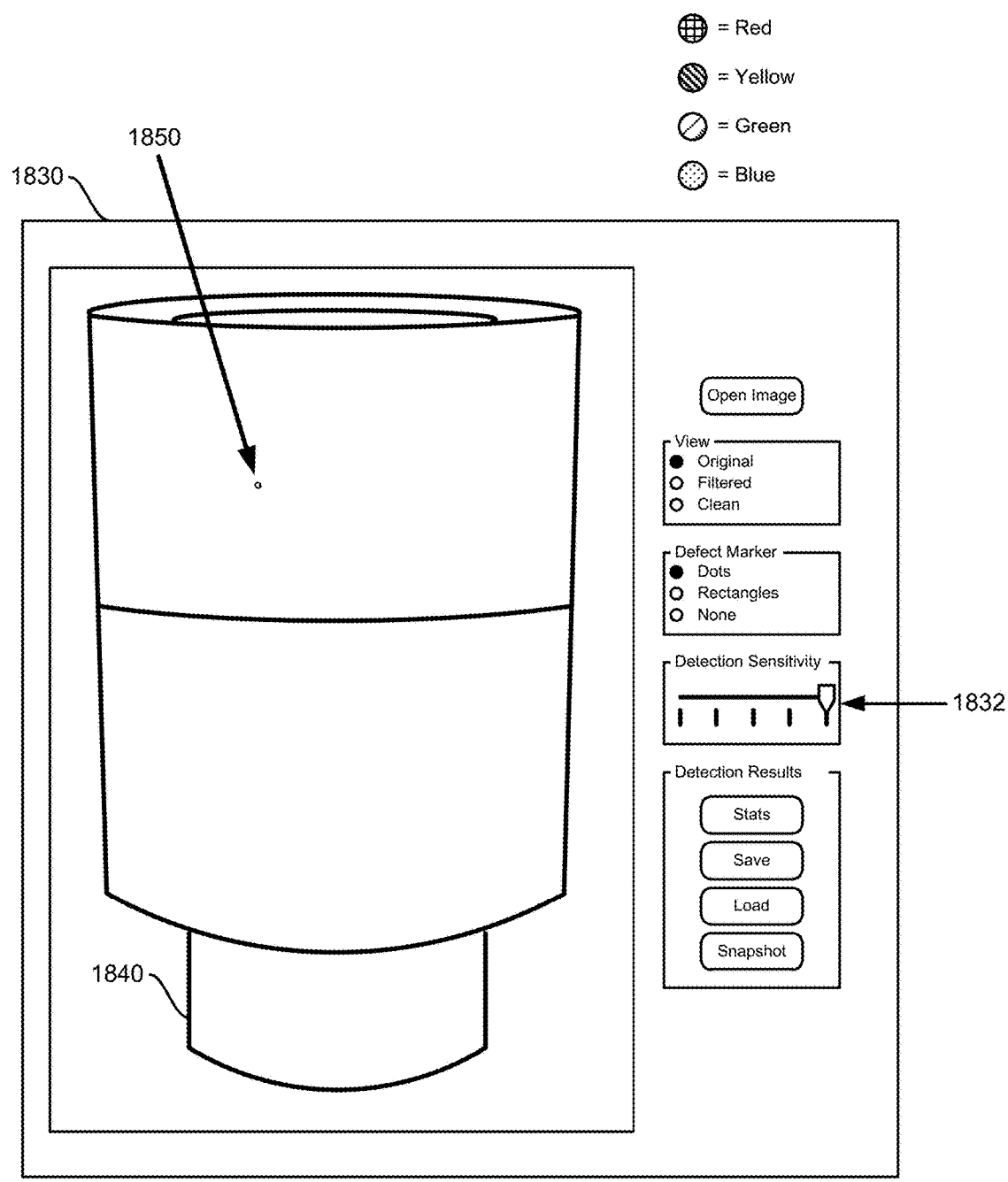
FIG. 18 illustrates an example embodiment of a user interface.

FIG. 18 illustrates an example embodiment of a user interface. This embodiment of a user interface 1830 also includes a "Detection Sensitivity" control 1832. In FIG. 18, the Detection Sensitivity control 1832 is set to the least-sensitive setting. Accordingly, the user interface 1830 displays a defect-score map 1850 that marks only one anomaly.

Figure 19:
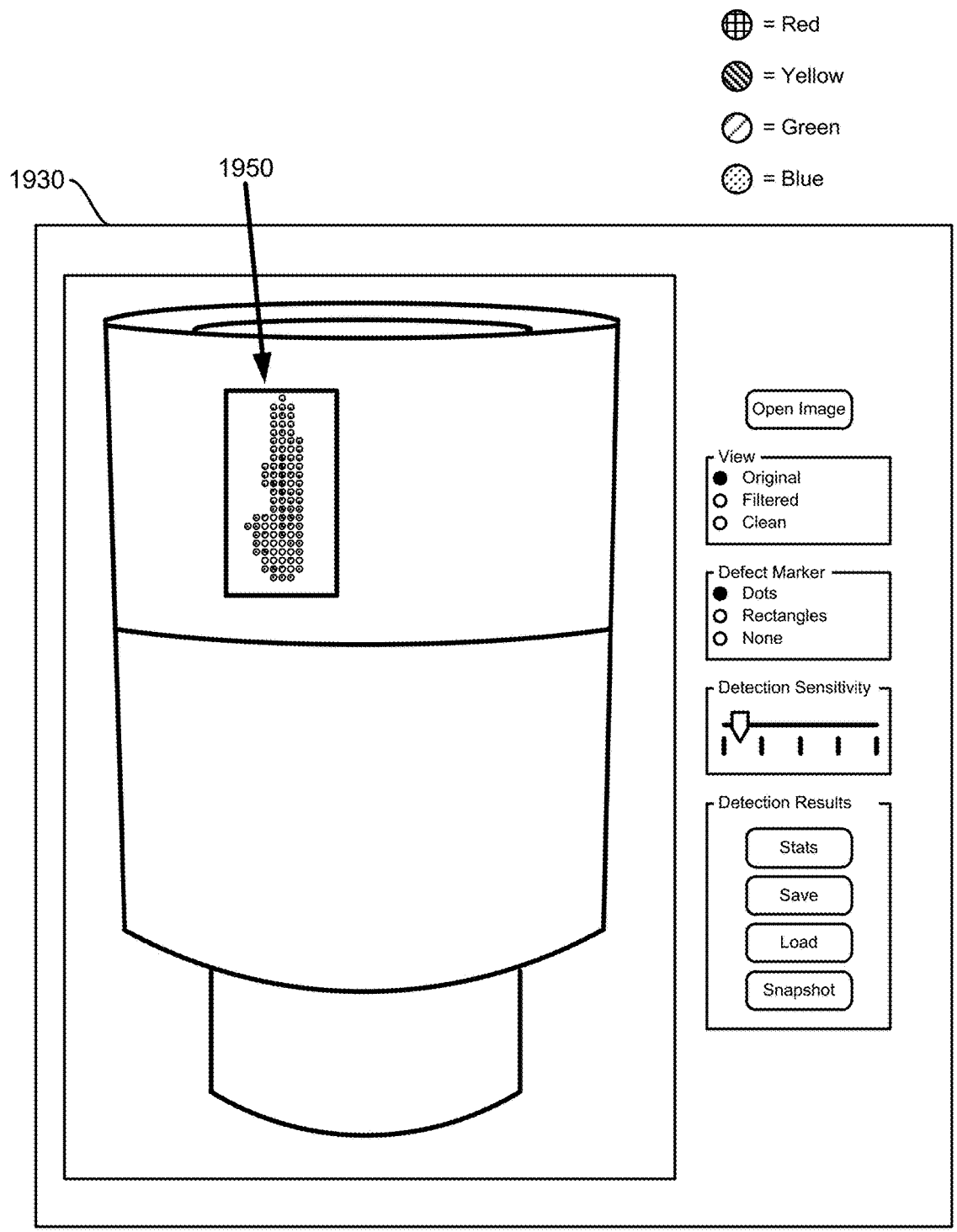
FIG. 19 illustrates an example embodiment of a user interface.

FIG. 19 illustrates an example embodiment of a user interface. This embodiment of a user interface 1930 displays a defect-score map 1950 that indicates the anomalies with dots and that surrounds the dots with a rectangle. The surrounding rectangle is a user-marked rectangle that confirms that the region has a defect.

Figure 20:
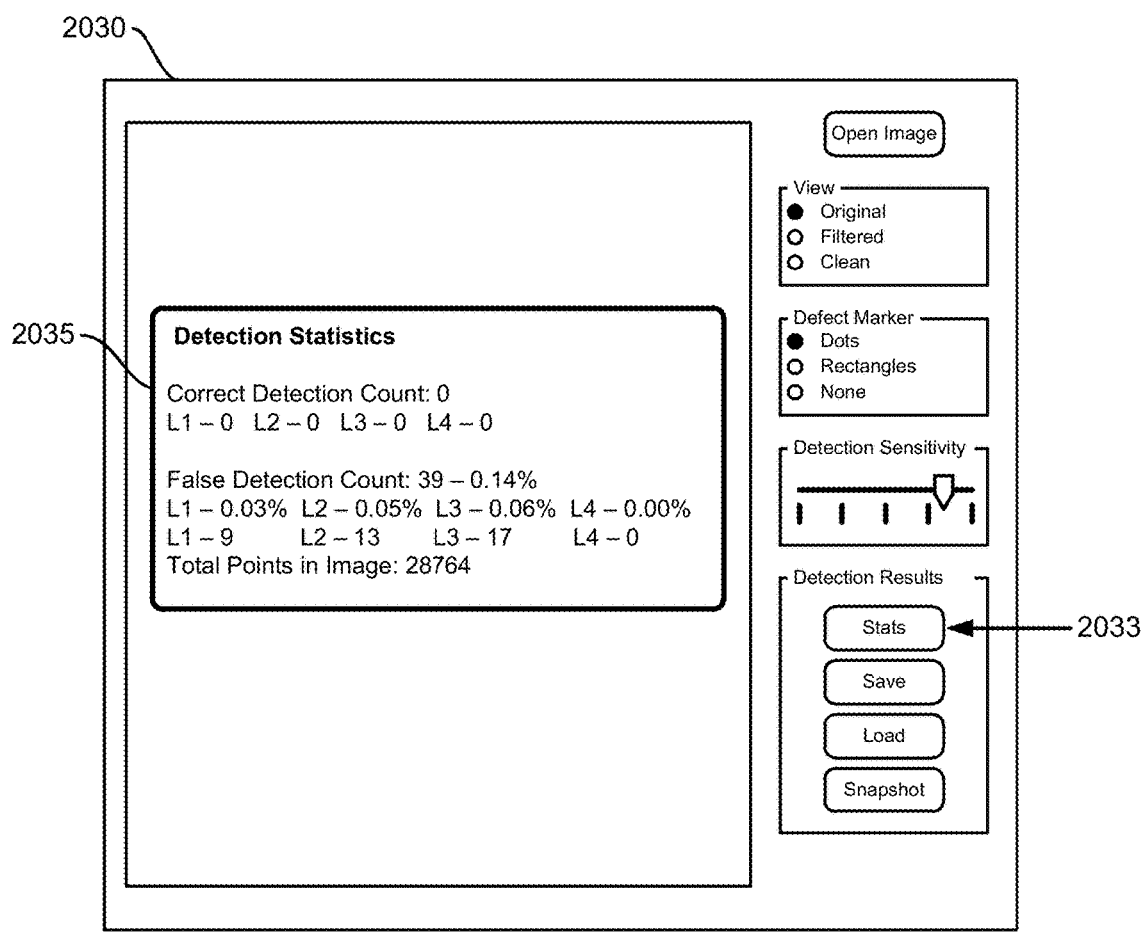
FIG. 20 illustrates an example embodiment of a user interface.

FIG. 20 illustrates an example embodiment of a user interface. This embodiment of a user interface 2030 shows Detection Statistics 2035, which may be displayed in response to the activation of the "Stats" control 2033.

Figure 21:
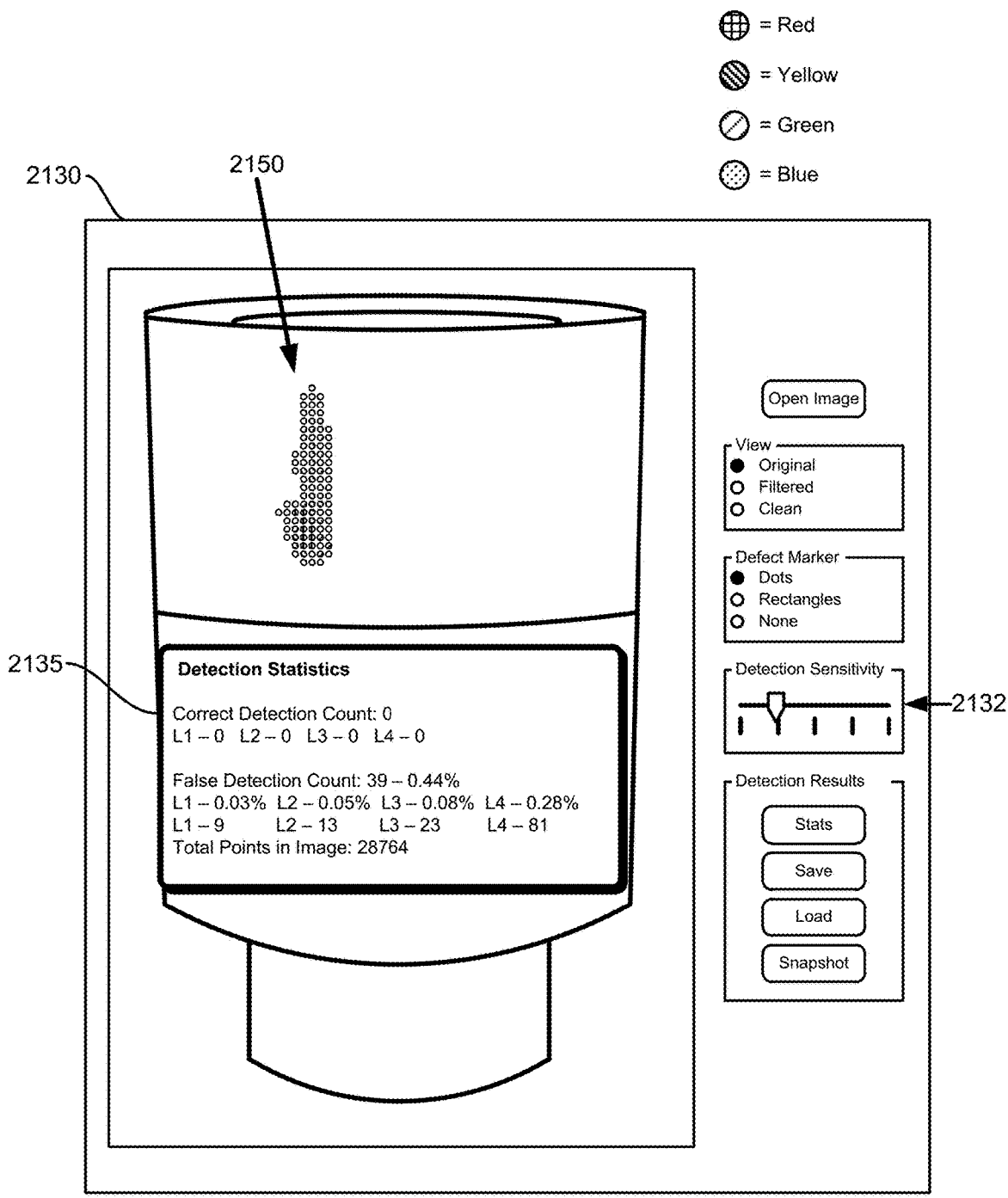
FIG. 21 illustrates an example embodiment of a user interface.

FIG. 21 illustrates an example embodiment of a user interface. This embodiment of a user interface 2130 displays both a defect-score map 2150, which indicates the anomalies in the image with dots, and Detection Statistics 2135 for the image. In this example, the Detection Sensitivity control 2132 is set to a more sensitive setting than the Detection Sensitivity control 1932 in FIG. 20. Thus, FIG. 21 has a count of 81 for "L4", in contrast to the count of 0 for "L4" in FIG. 20.

Figure 22:
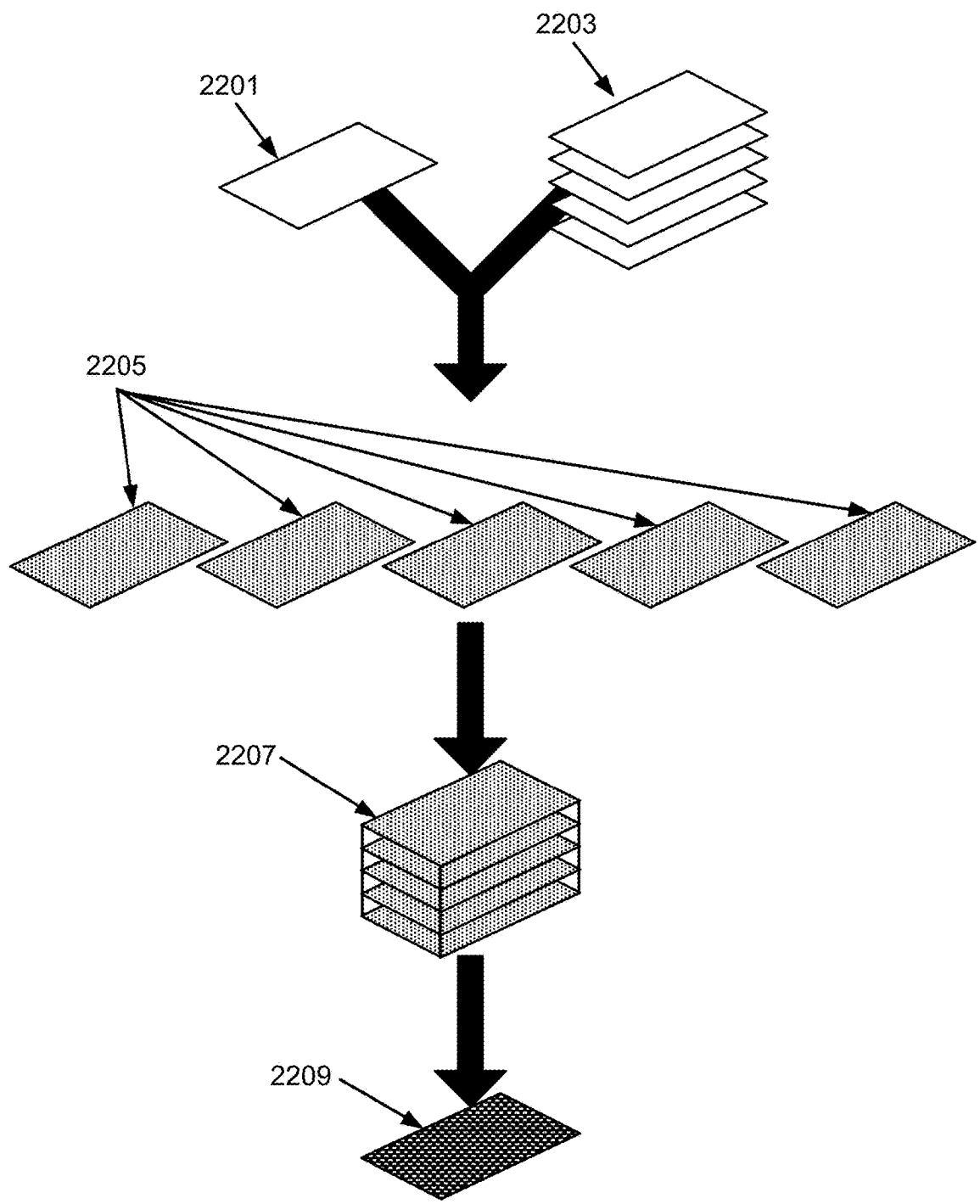
FIG. 22 illustrates example embodiments of a prime image, training images, image-similarity maps, an image-similarity-map matrix, and a normal-image-similarity map.

FIG. 22 illustrates example embodiments of a prime image, training images, image-similarity maps, an image-similarity-map matrix, and a normal-image-similarity map. The prime image 2201 and each of the training images 2203 are used to generate a respective one of the image-similarity maps 2205. For example, if the dimensions of the prime image 2201 and the training images 2203 are 100×50 (as measured in pixels), and if the step size S is 5, then the dimensions of each image-similarity map 2205 are 20×10. Some embodiments may crop images to the same dimensions. The five image-similarity maps 2205 (one per training image) are used to generate an image-similarity-map matrix 2207, which has the following dimensions in this example: 20×10×5. The image-similarity-map matrix 2207 is used to generate a normal-image-similarity map 2209, which has the following dimensions in this example: 20×10. Also, if each entry in the normal-image-similarity map 2209 has d dimensions, then the dimensions would be 20×10×d. For example, in some embodiments each entry has two dimensions: a median and a standard deviation.

Figure 23:
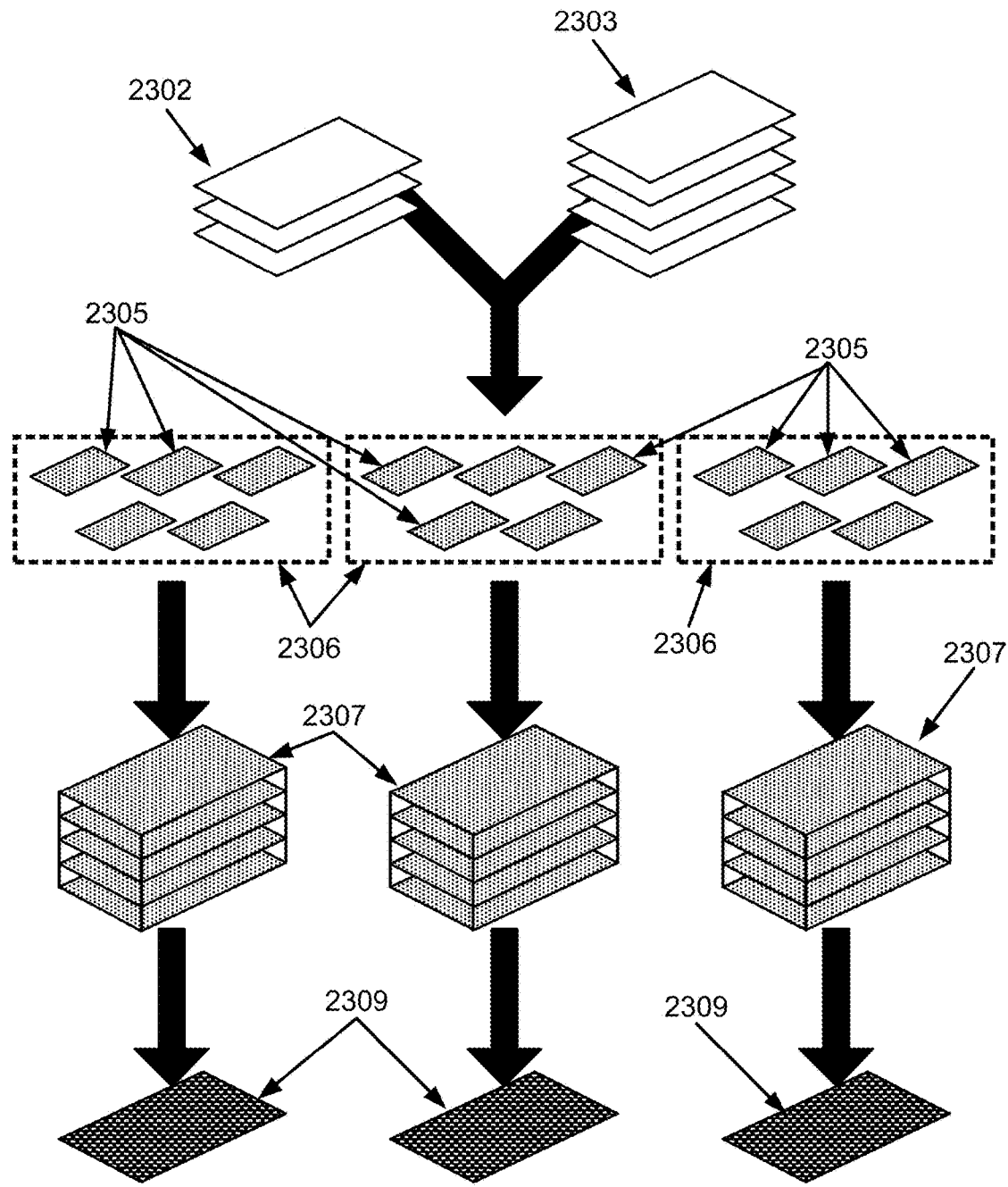
FIG. 23 illustrates example embodiments of reference images, training images, image-similarity maps, image-similarity-map matrices, and normal-image-similarity maps.

FIG. 23 illustrates example embodiments of reference images, training images, image-similarity maps, image-similarity-map matrices, and normal-image-similarity maps. Each reference image 2302 and each of the training images 2303 is used to generate a respective one of the image-similarity maps 2305. If the dimensions of the reference image 2302 and the training images 2303 are 200×150 pixels, and if the step size S is 10, then the dimensions of each image-similarity map 2305 are 20×15. Some embodiments may crop images to the same dimensions. The image-similarity maps 2305 are generated from each combination of a reference image 2302 and a training image 2303. Thus, fifteen image-similarity maps 2305 are generated. The image-similarity maps 2305 are sorted into groups 2306 by reference image 2302. Accordingly, one group 2306 of image-similarity maps 2305 includes the five image-similarity maps 2305 that were generated from a particular reference image 2302 and each of the five training images 2303.

The five image-similarity maps in a group 2306 are used to generate a respective image-similarity-map matrix 2307, which has the following dimensions in this example: 20×15×5. Therefore, because there are three reference images 2302 and three groups 2306, three image-similarity-map matrices 2307 are generated, one per reference image 2302. Each image-similarity-map matrix 2307 is used to generate a respective normal-image-similarity map 2309, which has the following dimensions in this example: 20×15. Also, if each entry in a normal-image-similarity map 2309 has d dimensions, then the dimensions would be 20×15× d.

Figure 24:
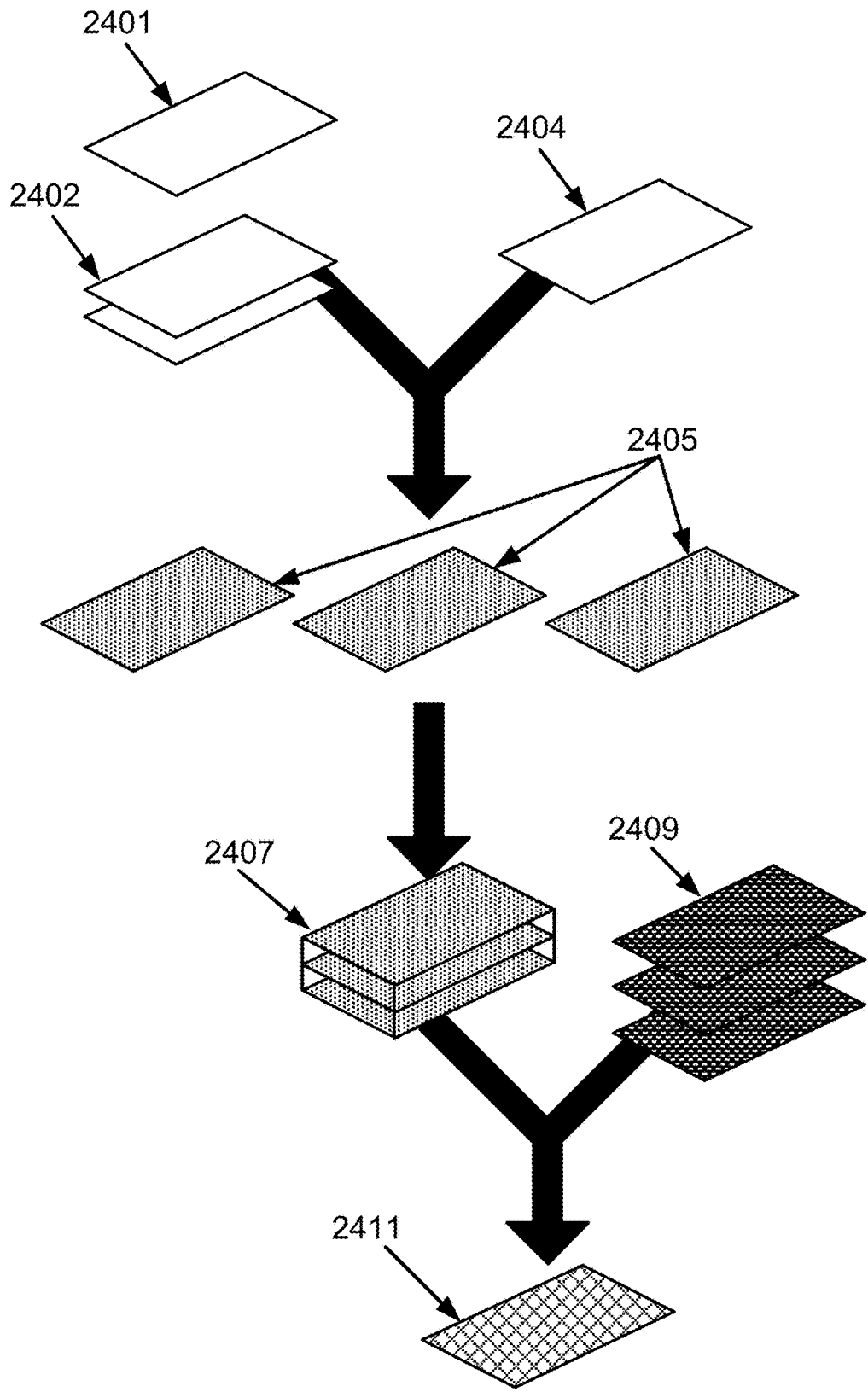
FIG. 24 illustrates example embodiments of a prime image, reference images, a test image, image-similarity maps, an image-similarity-map matrix, normal-similarity-score maps, and a defect-score map.

FIG. 24 illustrates example embodiments of a prime image, reference images, a test image, image-similarity maps, an image-similarity-map matrix, normal-similarity-score maps, and a defect-score map. The test image 2404 is used to generate a respective image-similarity map 2405 with each of the prime image 2401 and the reference images 2402, thereby producing three image-similarity maps 2405. If the dimensions of the reference image 2402 and the training images 2403 are 100×100 pixels, and the step size S is 5, then the dimensions of each image-similarity map 2405 are 20×20. The three image-similarity maps 2405 may be combined to produce an image-similarity-map matrix 2407, which has the following dimensions in this example: 20×20×3.

The three image-similarity maps 2405, which may be included in the image-similarity-map matrix 2407, are each compared with the corresponding normal-similarity-score map 2409 (with dimensions of 20×20) of the prime image 2401 or the reference image 2402 that was used to generate the respective image-similarity map 2405. For example, the image-similarity map 2405 that was generated based on the prime image 2401 is compared to the respective normal-similarity-score map 2409 of the prime image, which is the normal-image-similarity map 2409 that was generated based on the prime image 2401 (e.g., as described in block B350 in FIG. 3). Based on these comparisons, a defect-score map 2411, with dimensions of 20×20, is generated.

Figure 25:
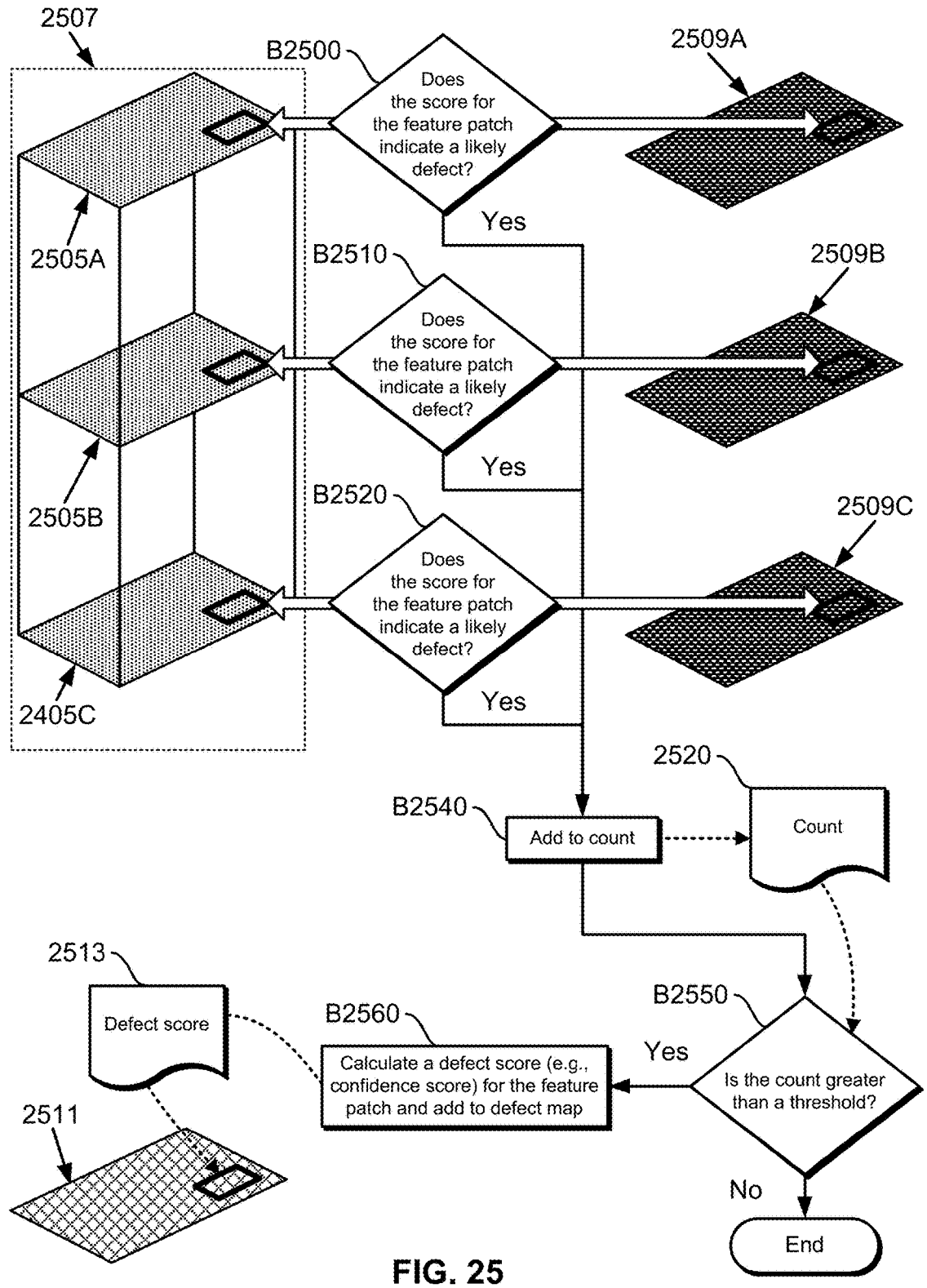
FIG. 25 illustrates an example embodiment of an operational flow for generating a defect-score map.

FIG. 25 illustrates an example embodiment of an operational flow for generating a defect-score map. First, in blocks B2500-B2520, the corresponding dissimilarity score (e.g., an EMD) of a feature patch in each image-similarity map 2505 (2505A-2505C) in an image-similarity-map matrix 2507 is compared with the corresponding dissimilarity score or dissimilarity-score model (e.g., a probabilistic model) from the same feature patch in a respective one of a group of normal-similarity-score maps 2509 (2509A-2509C) to determine if the score for the feature patch indicates a likely defect (e.g., as described in block B836 in FIG. 8B). For example, the dissimilarity score of feature patch feature patch$_{ij}$ in the image-similarity-map 2505A that was generated based on a test image and a first reference image may be compared to the dissimilarity score or the dissimilarity-score model of feature patch feature patch$_{ij}$ in the normal-similarity-score map 2509A of the first reference image.

If the dissimilarity score in the feature patch in an image-similarity map 2505 indicates a likely defect, then in block B2540 the count 2520 is increased by one. This is performed for the feature patch for each pair of an image-similarity map 2505 and its corresponding normal-similarity-score map 2509. Afterwards, in block B2550, if the count 2520 exceeds a threshold, which may be defined based on a percentage of the pairs of an image-similarity map 2505 and a normal-similarity-score map 2509 (e.g., 50%), then a defect score 2513 is calculated for the feature patch, for example by calculating the sum of all the differences for the feature patch. Also, the defect score 2513 may include a confidence score. The defect score 2513 is then added to the defect-score map 2511 at the position of the feature patch. Additionally, some embodiments of the operational flow implement block B2550 differently. For example, some embodiments use probabilistic-techniques or machine-learning techniques to determine if the count 2520 indicates a likely defect in the feature patch in the test image.

In some embodiments, scores or probabilities are calculated for each image-similarity map based on the normal-similarity-score maps, and the scores are added or multiplied (instead of counting those above a threshold) to arrive at a determination of an anomaly confidence. In some embodiments, multiple methods (e.g., counting scores above a threshold, adding scores, multiplying scores) are combined, for example using a classifier or a rule-based system, to arrive at a determination of an anomaly.

Figure 26:
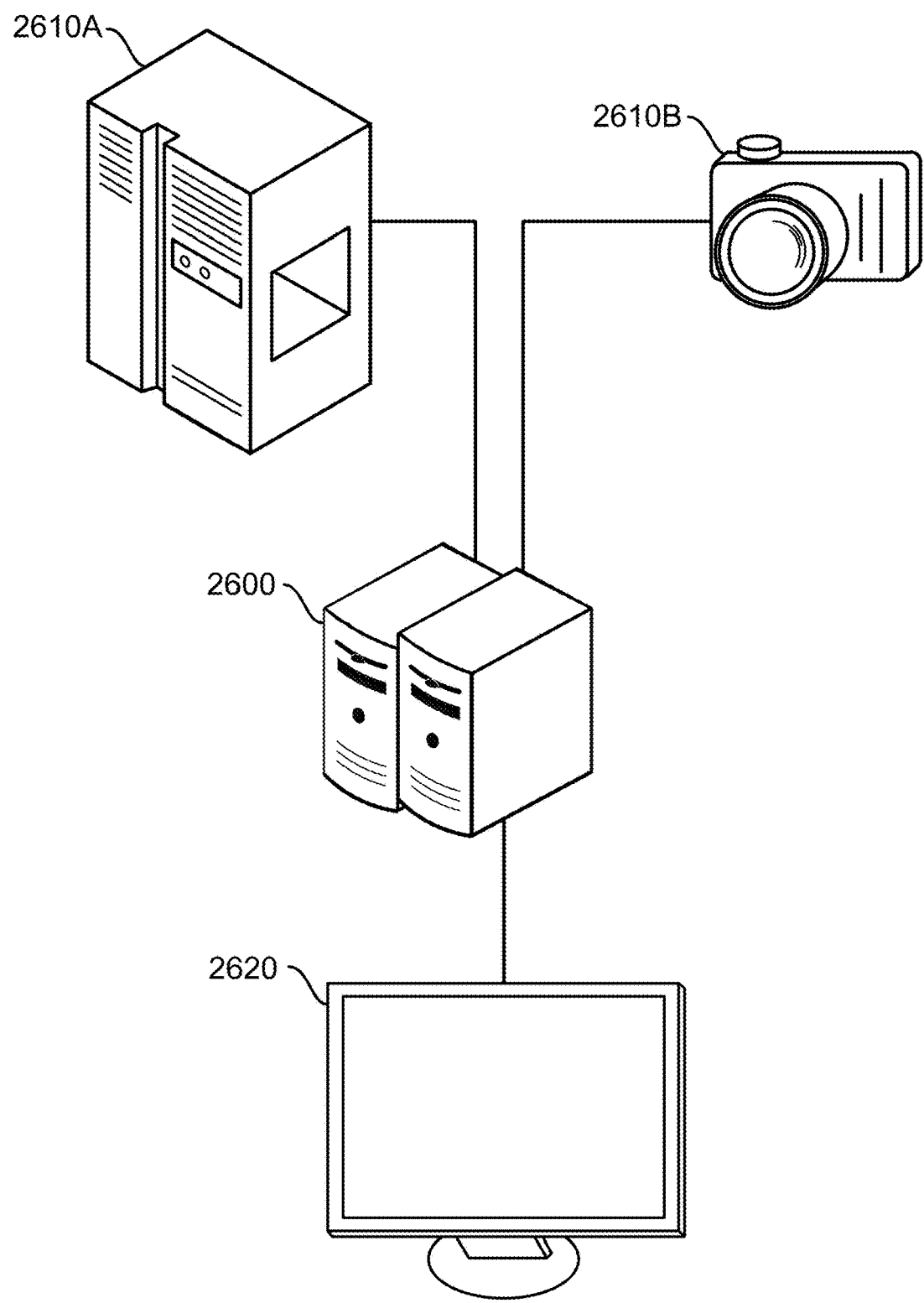
FIG. 26 illustrates an example embodiment of a system for comparing images.

FIG. 26 illustrates an example embodiment of a system for comparing images. The system includes one or more image-comparison devices 2600, which are specially-configured computing devices; one or more image-capturing devices 2610, such as an x-ray detector 2610A or a camera 2610B; and a display device 2620. Other embodiments may include more than one image-comparison devices 2600 or more than one display device 2620. Also, in some embodiments, the image-comparison devices 2600 are combined with the detection devices 100 in FIG. 1.

The system compares images (e.g., x-ray images, RGB images). For example, some embodiments of the system compare test images with one or more reference images to identify anomalies in the test images.

Figure 27A:
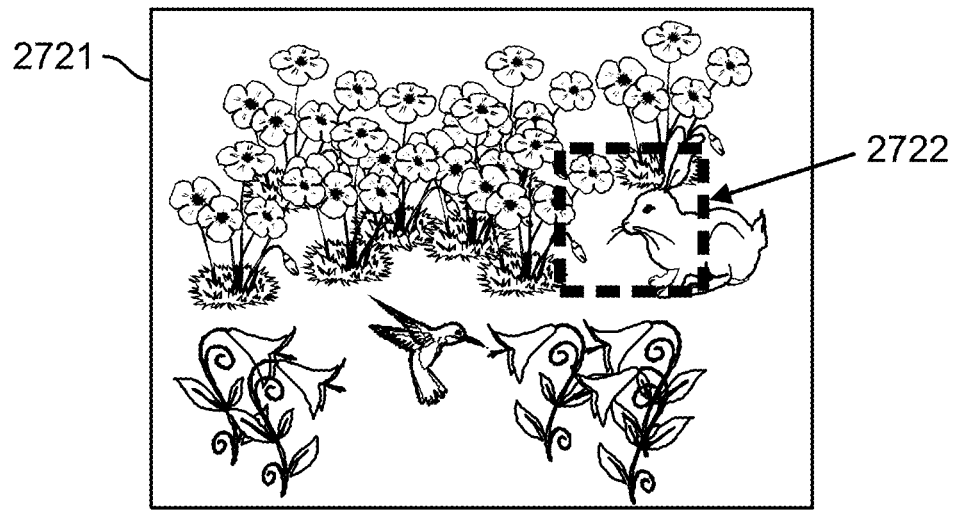
FIG. 27A illustrates example embodiments of an image and an image patch.
Figure 27B:
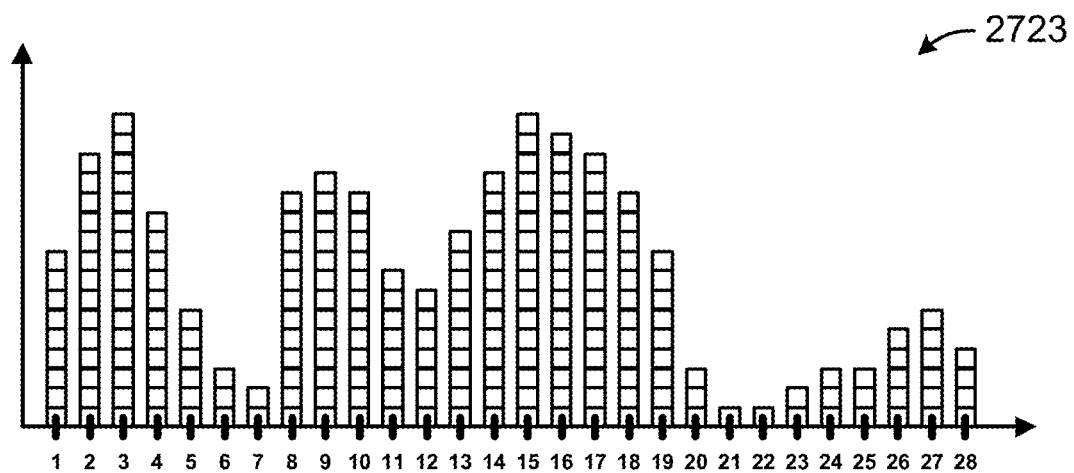
FIG. 27B illustrates an example embodiment of a histogram of the intensity values of the pixels in an image patch.

To compare two image patches (e.g., feature patches), the image-comparison devices 2600 generate a respective histogram of the intensity values in each image patch. FIG. 27A illustrates example embodiments of an image 2721 and an image patch 2722 (which may be a feature patch), and FIG. 27B illustrates an example embodiment of a histogram 2723 of the intensity values of the pixels in the image patch 2722.

The image-comparison devices 2600 then compare the two histograms, for example using an Earth Mover's Distance (EMD), such as a shift-invariant Earth Mover's Distance (SIEMD), as the measure of dissimilarity between the two histograms. The results of the comparison (e.g., the EMD) can then be used to determine how similar two images or image patches are to each other.

In some embodiments, the image patches may include partial pixel counts applied to the histogram. For example the patch may be "softly" defined so that pixels on the edge of the patch only contribute fractionally to the histogram while pixels in the central part of the patch contribute more fully.

Figure 28:
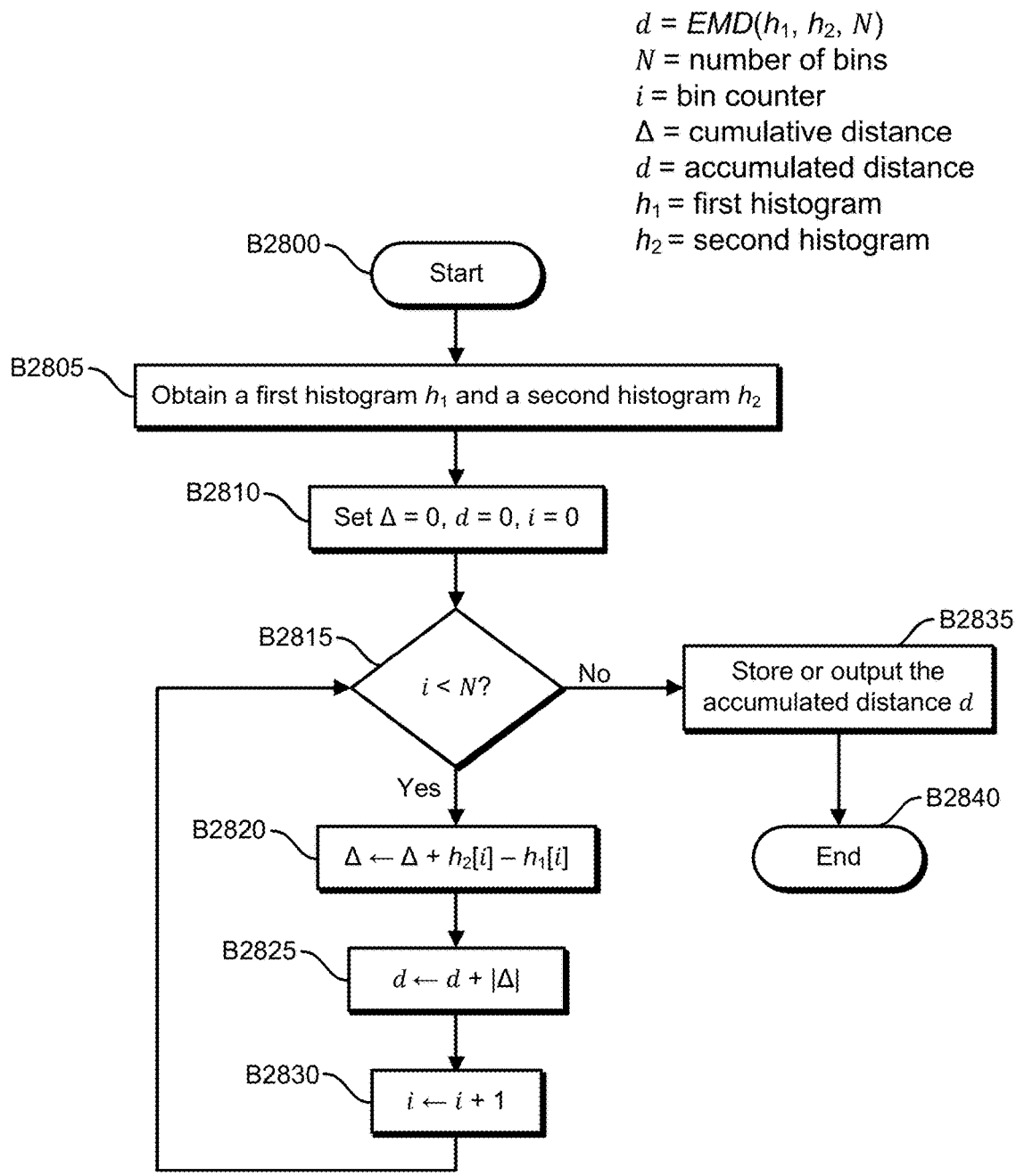
FIG. 28 illustrates an example embodiment of an operational flow for calculating an Earth Mover's Distance.

FIG. 28 illustrates an example embodiment of an operational flow for calculating an EMD. Furthermore, although this operational flow and some of the other operational flows that are described herein are performed by an image-comparison device, some embodiments of these operational flows may be performed by two or more image-comparison devices or by one or more other specially-configured computing devices (e.g., one or more detection devices).

The flow starts in block B2800 and then proceeds to block B2805, where the image-comparison device obtains a first histogram $h_1$ and a second histogram $h_2$. Next, in block B2810, the image-comparison device sets the cumulative distance Δ to 0, sets the accumulated distance d to 0, and sets the bin counter i to 0. The cumulative distance Δ indicates a cumulative surplus or a cumulative deficit of pixels. If there is a surplus of pixels in the current bin, then the EMD technique moves the surplus one bin further at a cost of the surplus amount. The accumulated distance d is updated with these costs by adding the surplus or deficit magnitudes to the accumulated distance d that is accumulated as the cost for each bin. Provided the histograms have the same total number of pixels as each other, or the histograms have been normalized so that their respective sums are equal, when the last bin is reached, the cumulative distance Δ will be zero. Thus all of the pixels will have been accounted for and been reallocated at the cost of the accumulated distance d.

The flow then proceeds to block B2815. In block B2815, the image-comparison device determines if the bin counter i is less than the number of bins N. If it is less (block B2815=Yes), then the flow moves to block B2820. Otherwise (block B2815=No) the flow moves to block B2835.

In block B2820, the image-comparison device sets the cumulative distance Δ to the current value of the cumulative distance Δ plus the number of pixels in the i-th bin of the second histogram $h_2[i]$ minus the number of pixels in the i-th bin of the first histogram $h_1[i]$. Next, in block B2825, the image-comparison device sets the accumulated distance d to the current accumulated distance d plus the absolute value of the cumulative distance Δ. The flow then moves to block B2830, where the image-comparison device increases the bin counter i by one. After block B2830, the flow returns to block B2815.

If in block B2815 the image-comparison device determines that the bin counter i is not less than the number of bins N, then the flow moves to block B2835. In block B2835, the image-comparison device stores or outputs the accumulated distance d, and then the flow ends in block B2840.

Figure 29A:
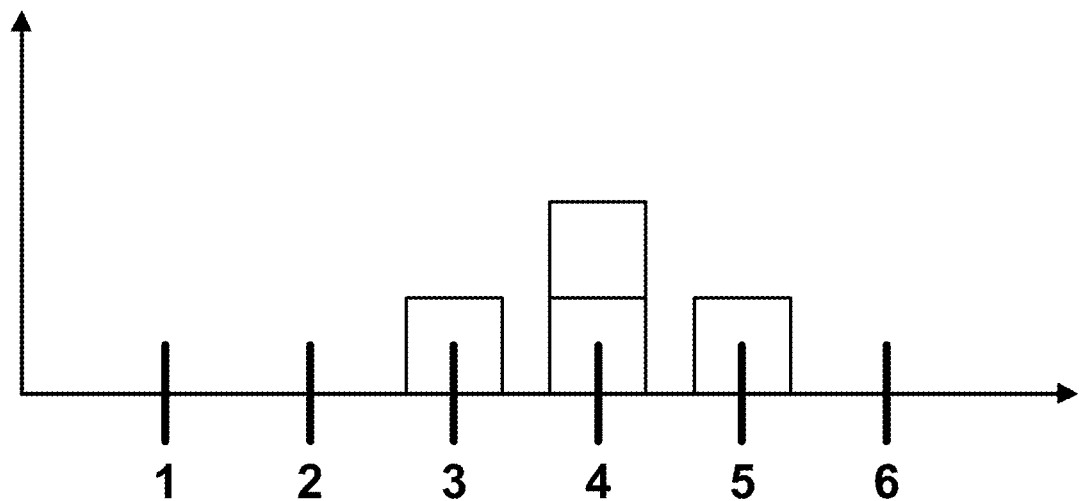
FIGS. 29A and 29B illustrate example embodiments of histograms.
Figure 29B:
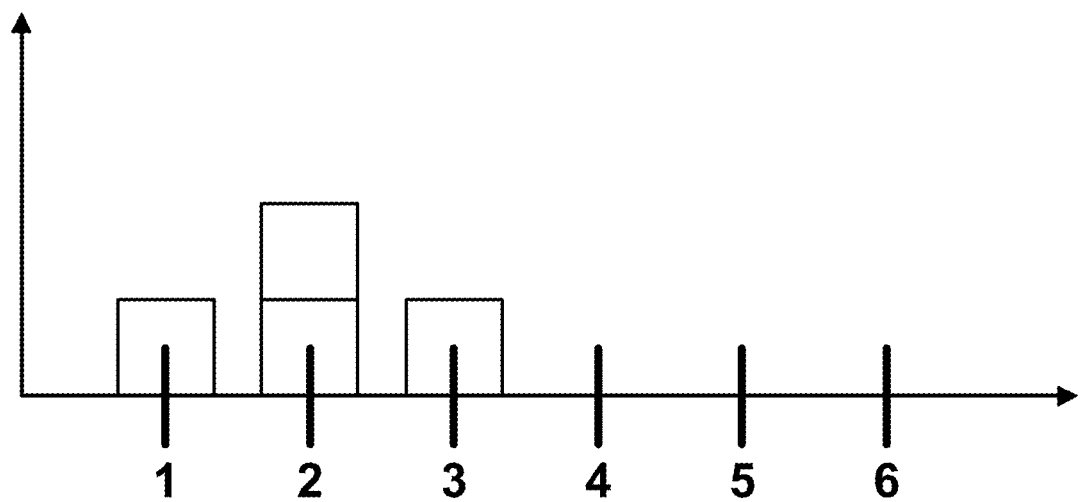

FIGS. 29A and 29B illustrate example embodiments of histograms. FIG. 29A illustrates a first histogram $h_1$, and FIG. 29B illustrates a second histogram $h_2$. Both of the histograms in this example have 6 bins, which are numbered with bin indices of 1 to 6. Each bin is a repository that holds pixels of the same intensity, and the six bins contain varying numbers of pixels. When rearranging the pixel intensities, moving one pixel to the preceding bin or the next bin costs one unit of work, moving one pixel 2 bins over costs 2 units of work, and so on. Thus, the cost in units of work equals the number of pixels multiplied by the distance, in intensity bins, of the move. The basic EMD between two histograms can be described as the minimum cost needed to transform one histogram into the other histogram. For example, to transform the arrangement of pixel intensities in the first histogram $h_1$ in FIG. 29A into the arrangement of pixel intensities in the second histogram $h_2$ in FIG. 29B, each pixel must be carried two bins to the left. This requires 8 units of work (2 units per pixel).

However, some embodiments of the image-comparison devices 100 use a shift-invariant Earth Mover's Distance (SIEMD) to compare the two histograms. SIEMD has the objective of transforming the layout of the first arrangement to the layout of the second arrangement with the freedom of being able to freely shift the bin indices. Conceptually, SIEMD calculates the minimal amount of work to change the shape of the first arrangement into the shape of the second arrangement. Because the arrangement of pixels in the first histogram $h_1$ in FIG. 29A has the same shape as the arrangement of pixels in the second histogram $h_2$ in FIG. 29B, the SIEMD between the two histograms is zero.

Figure 30A:
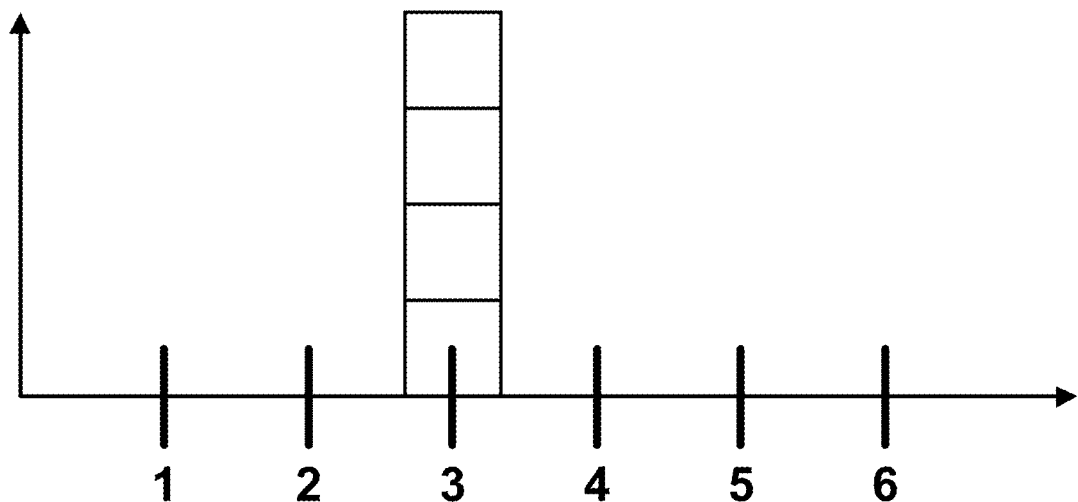
FIGS. 30A and 30B illustrate example embodiments of histograms.
Figure 30B:
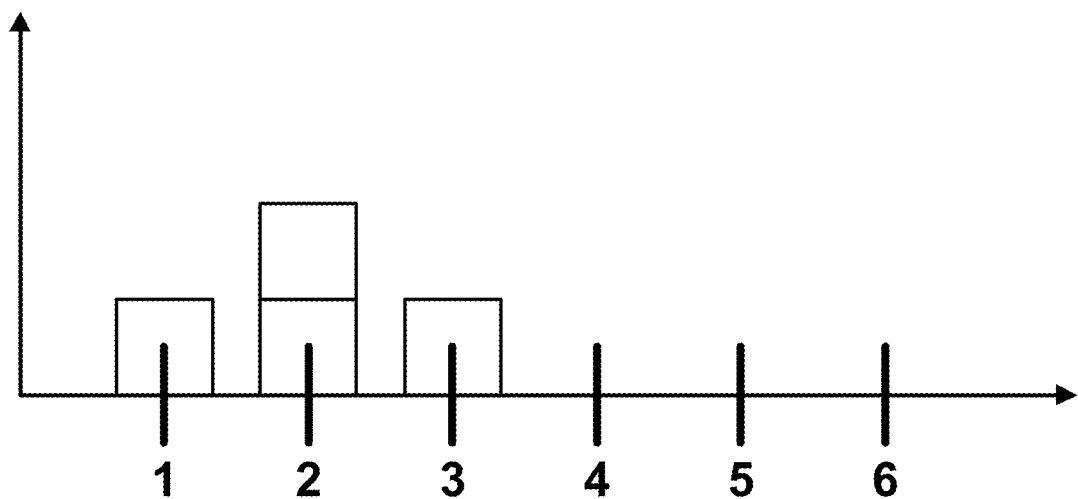

FIGS. 30A and 30B illustrate example embodiments of histograms. FIG. 30A illustrates a first histogram $h_1$, and FIG. 30B illustrates a second histogram $h_2$. Using the basic EMD, to change the shape of the arrangement of the first histogram $h_1$ in FIG. 30A into the shape of the arrangement of the second histogram $h_2$ in FIG. 30B, the distance would be the cost associated with moving 1 pixel from bin 3 to bin 1 (cost 2) and 2 pixels from bin 3 to bin 2 (cost 2). Thus the basic EMD is 4.

But using a SIEMD (instead of a basic EMD), where the shape of the arrangement of the first histogram $h_1$ in FIG. 30A can be changed into the shape of the arrangement of the second histogram $h_2$ in FIG. 30B with no-cost bin-index shifting, the bins of the arrangement of the first histogram $h_1$ can be renumbered to start at zero instead of one, and thus the re-arrangement cost is 2: the cost of moving 1 pixel from renumbered bin 2 (originally bin 3) to renumbered bin 1 (originally bin 2) and the cost of moving another pixel from renumbered bin 2 to renumbered bin 3 (originally bin 4). This renumbering can be accomplished by shifting the bins of the first histogram $h_1$ left by one bin, which can be performed by renumbering the bins by subtracting 1 from each bin number.

Also, if the arrangements of two histograms are similar but shifted, then the SIEMD may better capture this similarity even when the shift is significant.

Figure 31A:
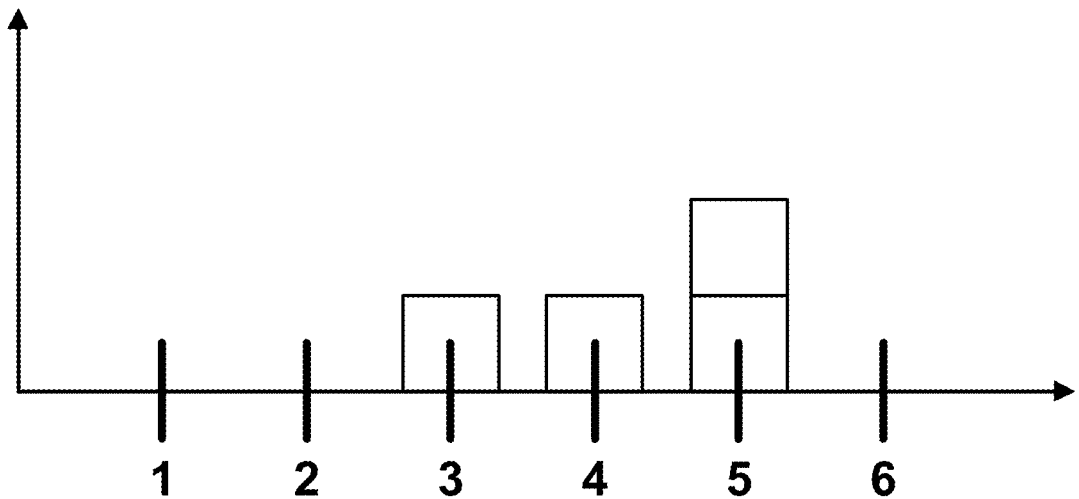
FIGS. 31A and 31B illustrate example embodiments of histograms.
Figure 31B:
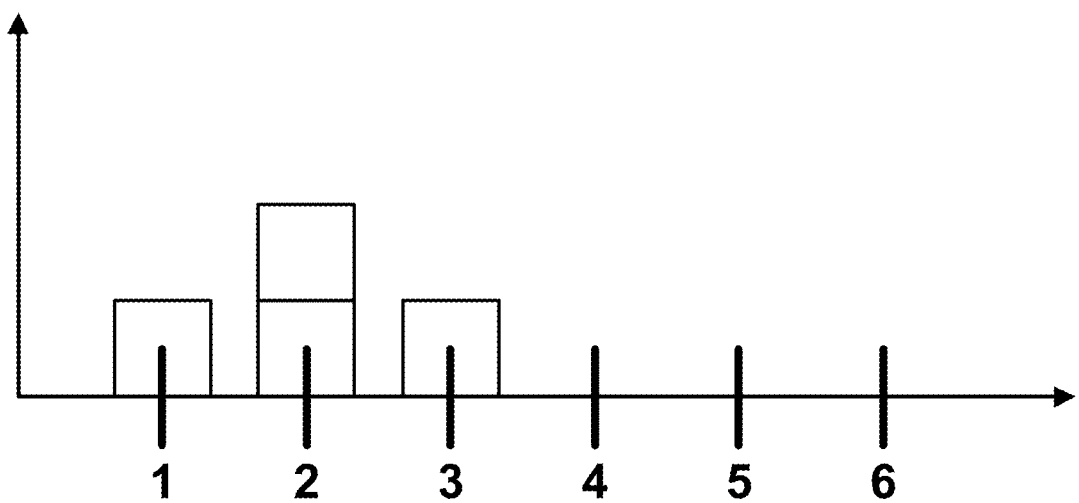

FIGS. 31A and 31B illustrate example embodiments of histograms. FIG. 31A illustrates a first histogram $h_1$, and FIG. 31B illustrates a second histogram $h_2$. Using the basic EMD, changing the arrangement of the first histogram $h_1$ to the arrangement of the second histogram $h_2$ requires 9 units of work: 2 units for moving one brick from bin 3 to bin 1, 2 units for moving one brick from bin 4 to bin 2, 3 units for moving one brick from bin 5 to bin 2, and 2 units for moving one brick from bin 5 to bin 3. In contrast, using the SIEMD, changing the arrangement of the first histogram $h_1$ to the arrangement of the second histogram $h_2$ requires 1 unit of work.

In the previous examples, the arrangements in FIGS. 30A and 30B have a basic EMD of 4 units, and the arrangements in FIGS. 31A and 31B have a basic EMD of 9 units. However, in some ways the arrangements in FIGS. 31A and 31B are more similar than the arrangements in FIGS. 30A and 30B. And according to the SIEMD, the arrangements in FIGS. 31A and 31B are more similar than the arrangements in FIGS. 30A and 30B.

Figure 32:
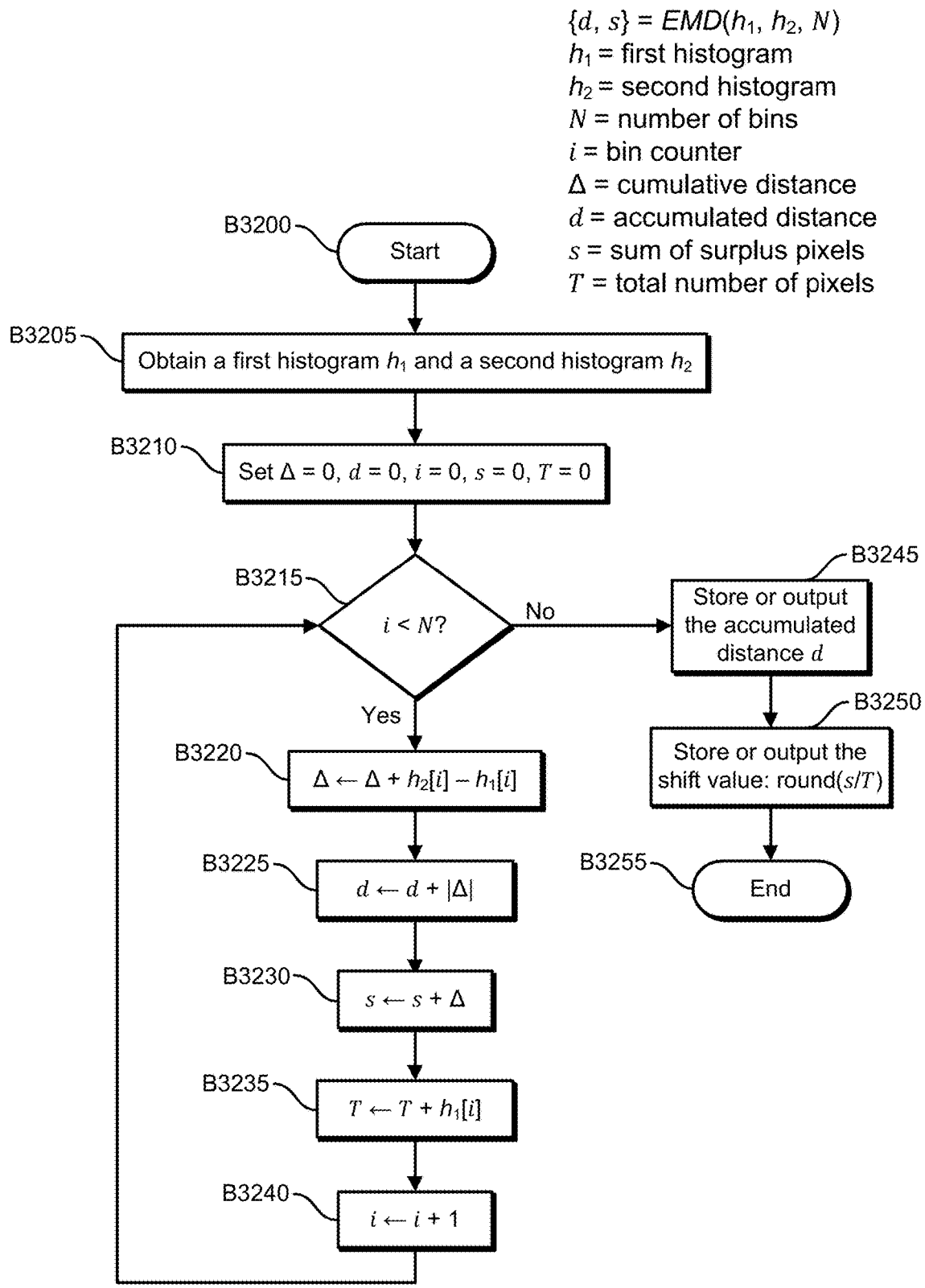
FIG. 32 illustrates an example embodiment of an operational flow for calculating an Earth Mover's Distance and a shift value.

FIG. 32 illustrates an example embodiment of an operational flow for calculating an Earth Mover's Distance and a shift value. The flow starts in block B3200 and then moves to block B3205, where the image-comparison device obtains a first histogram $h_1$ and a second histogram $h_2$. Next, in block B3210, the image-comparison device sets the cumulative distance Δ to 0, sets the accumulated distance d to 0, sets the bin counter i to 0, sets the sum of surplus pixels s to 0, and sets the total number of pixels T to 0.

The flow then proceeds to block B3215. In block B3215, the image-comparison device determines if the bin counter i is less than the number of bins N. If it is less (block B3215=Yes), then the flow moves to block B3220, otherwise (block B3215=No) the flow moves to block B3245.

In block B3220, the image-comparison device sets the cumulative distance Δ to the current value of the cumulative distance Δ plus the number of pixels in the i-th bin of the second histogram $h_2[i]$ minus the number of pixels in the i-th bin of the first histogram $h_1[i]$. Next, in block B3225, the image-comparison device sets the accumulated distance d to the current accumulated distance d plus the absolute value of the cumulative distance Δ. Also, in block B3230, the image-comparison device increases the sum of surplus pixels s by the cumulative distance Δ. Then, in block B3235, the image-comparison device increases the total number of pixels T by the number of pixels in the i-th bin of the first histogram $h_1[i]$. The flow then moves to block B3240, where the image-comparison device increases the bin counter i by one. After block B3240, the flow returns to block B3215.

If in block B3215 the image-comparison device determines that the bin counter i is not less than the number of bins N (block B3215=No), then the flow moves to block B3245. In block B3245, the image-comparison device stores or outputs the accumulated distance d. Next, in block B3250, the image comparison device stores or outputs the shift value, which is equal to the sum of surplus pixels s divided by the total number of pixels T. The shift value may be a rounded shift value, which is a shift value that is rounded off to the nearest integer. Finally, the flow ends in block B3255.

For example, using the histograms in FIGS. 29A and 29B, at the first bin Δ=1, d=1, s=1, and T=0 after the first iteration of blocks B3220 to B3240. At the second bin, Δ=3, d=4, s=4, and T=0 after the second iteration of blocks B3220 to B3240. At the third bin, Δ=3, d=7, s=7, and T=1 after the third iteration of blocks B3220 to B3240. At the fourth bin, Δ=1, d=8, s=8, and T=3 after the fourth iteration of blocks B3220 to B3240. At the fifth bin, Δ=0, d=8, s=8, and T=4 after the fifth iteration of blocks B3220 to B3240. And at the sixth bin, Δ=0, d=8, s=8, and T=4 after the sixth iteration of blocks B3220 to B3240. Accordingly, the rounded shift is 2.

Figure 33:
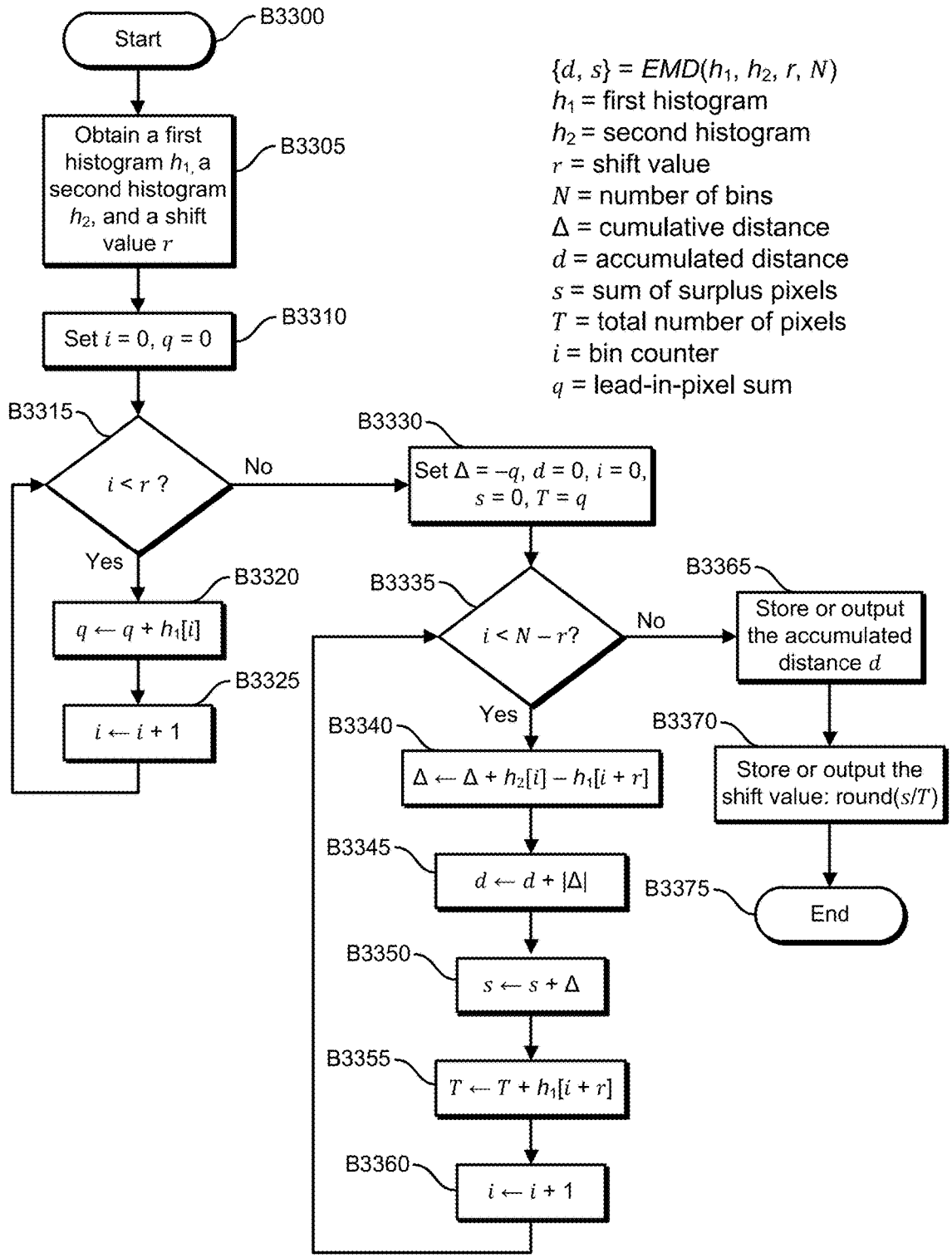
FIG. 33 illustrates an example embodiment of an operational flow for calculating a shift-invariant Earth Mover's Distance and a shift value.

FIG. 33 illustrates an example embodiment of an operational flow for calculating a shift-invariant Earth Mover's Distance (SIEMD) and a shift value. The flow starts in block B3300 and then moves to block B3305, where the image-comparison device obtains a first histogram $h_1$, a second histogram $h_2$, and a shift value r (e.g., from block B3250 in FIG. 32), which may be a rounded shift value. Then, in block B3310, the image-comparison device sets a bin counter i to 0 and sets a lead-in-pixel sum q to 0.

The flow then moves to block B3315, where the image-comparison device determines if the bin counter i is less than the shift value r. If yes (block B3315=Yes), then the flow proceeds to block B3320. Otherwise (block B3315=No) the flow proceeds to block B3330.

In block B3320 the image-comparison device increases the lead-in-pixel sum q by the number of pixels in the i-th bin of the first histogram $h_1[i]$. Next, in block B3325, the image-comparison device increases the bin counter i by one, and then the flow returns to block B3315.

If in block B3315 the image-comparison device determines that the bin counter i is not less than the shift value r (block B3315=No), then the flow moves to block B3330. In block B3330, the image-comparison device sets the cumulative distance Δ to the negative of the lead-in-pixel sum q (i.e., to −q), sets the accumulated distance d to 0, sets the bin counter i to 0, sets the sum of surplus pixels s to 0, and sets the total number of pixels T to q.

The flow then proceeds to block B3335. In block B3335, the image-comparison device determines if the bin counter i is less than the number of bins N minus the shift value r. If it is less (block B3335=Yes), then the flow moves to block B3340. Otherwise (block B3335=No) the flow moves to block B3365.

In block B3340, the image-comparison device sets the cumulative distance Δ to the current value of the cumulative distance Δ plus the number of pixels in the i-th bin of the second histogram $h_2[i]$ minus the number of pixels in the (i+r)-th bin of the first histogram $h_1[i+r]$. Next, in block B3345, the image-comparison device sets the accumulated distance d to the current accumulated distance d plus the absolute value of the cumulative distance Δ. Also, in block B3350, the image-comparison device increases the sum of surplus pixels s by the cumulative distance Δ. Then, in block B3355, the image-comparison device increases the total number of pixels T by the number of pixels in the (i+r)-th bin of the first histogram $h_1[i+r]$. The flow then moves to block B3360, where the image-comparison device increases the bin counter i by one. After block B3360, the flow returns to block B3335.

If in block B3335 the image-comparison device determines that the bin counter i is not less than the number of bins N minus the shift value r (block B3335=No), then the flow moves to block B3365. In block B3365, the image-comparison device stores or outputs the accumulated distance d. Next, in block B3370, the image comparison device stores or outputs the shift value, which is equal to the sum of surplus pixels s divided by the total number of pixels T. The shift value may be rounded. Finally, the flow ends in block B3375.

This embodiment works for positive shift values r as inputs. If a negative shift value r is required, then this embodiment may be modified by swapping the first and second histograms (i.e., changing the first histogram into the second histogram and vice versa) and by using the swapped histograms and the absolute value of the shift value r as inputs. Because the EMD is symmetric, the distance between a first arrangement shifted by the shift value r to a second arrangement is the same as the distance between the second arrangement shifted by the negative of the shift value −r and the first arrangement. Also, if the shift value r is zero, then the embodiment in FIG. 33 will produce the same output as the embodiment in FIG. 32.

For example, an image-comparison device performs blocks B3315 through B3325 using the histograms in FIGS. 29A and 29B and a shift value r of 2 (r=2). The image comparison device calculates the sum of the first two bins of the first histogram $h_1$, thereby producing a lead-in-pixel sum q that equals 0. Then the image-comparison device performs blocks B3335 through B3360. At the first bin, Δ=0, d=0, s=0, and T=1 after the first iteration of blocks B3340 to B3360. At the second bin, Δ=0, d=0, s=0, and T=3 after the second iteration of blocks B3340 to B3360. At the third bin, Δ=0, d=0, s=0, and T=4 after the third iteration of blocks B3340 to B3360. And at the fourth bin, Δ=0, d=0, s=0, and T=4 after the fourth iteration of blocks B3340 to B3360. Finally, the image-comparison device performs blocks B3365 through B3375, where it outputs a distance d of 0 and a rounded shift of 0.

In some embodiments of the operational flow in FIG. 33, the cost of moving pixels in the non-overlapping shifted region (blocks B3315 to B3325) may be accounted for. In some of these embodiments, the operational flow allows the pixels in the non-overlapping regions to be moved for free. However, this cost may be accounted for in blocks B3315 to B3325. In some of these embodiments, the accumulated distance d begins accumulating in blocks B3315 to B3325 instead of beginning in blocks B3335 to B3360. Also, in some embodiments, this cost may be accounted for at a different rate. For example, some embodiments may apply a cost discount to the cost in blocks B3315 to B3325. And some embodiments may apply the cost non-linearly over these bins. In some embodiments, an additional operational loop may be added to account for costs incurred for bins of the second arrangement starting from N−r to N−1. This additional operational loop is not shown in the embodiment of FIG. 33 because this embodiment does not account for costs in that region.

Figure 34:
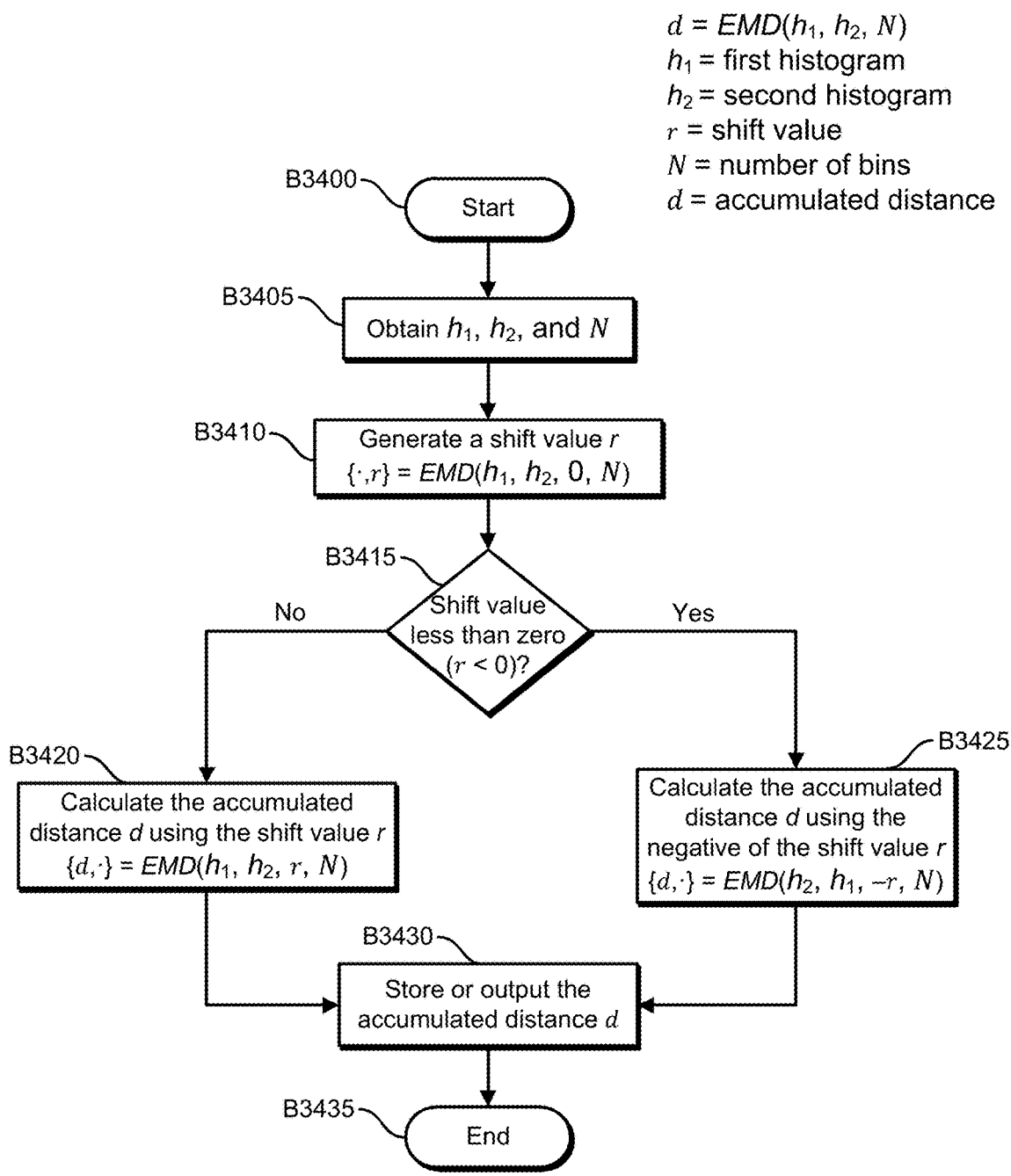
FIG. 34 illustrates an example embodiment of an operational flow for calculating a shift-invariant Earth Mover's Distance.

FIG. 34 illustrates an example embodiment of an operational flow for calculating a shift-invariant Earth Mover's Distance (SIEMD). The flow starts in block B3400 and then moves to block B3405, where the image-comparison device obtains a first histogram $h_1$, a second histogram $h_2$, and a total number of bins N. Next, in block B3410, the image-comparison device generates a shift value r based on the first histogram $h_1$, the second histogram $h_2$, and the total number of bins N. For example, the image-comparison device may perform the operational flow in FIG. 33 using zero as the initial shift value r and using the rounded shift value from block B3370 as the generated shift value r. Also for example, the image-comparison device may perform the operational flow in FIG. 32, using the rounded shift value from block B3250 as the generated shift value r. The operations of block B3410 may also produce an accumulated distance d, which may be saved or discarded.

Then in block B3415 the image-comparison device determines if the shift value r is less than zero. If the shift value r is not less than zero (block B3415=No), then the flow moves to block B3420. In block B3420, the image-comparison device calculates the accumulated distance d based on the first histogram $h_1$, on the second histogram $h_2$, on the shift value r, and, in some embodiments, on the total number of bins N, for example as described in FIG. 33. The flow then moves to block B3430.

However, if the shift value r is less than zero (block B3415=Yes), then the flow proceeds to block B3425. In block B3425, the image-comparison device calculates the accumulated distance d based on the first histogram $h_1$, on the second histogram $h_2$, on the negative of the shift value r (which is a positive number), and, in some embodiments, on the total number of bins N, for example as described in FIG. 33. Note that, in the embodiment of the EMD function call in block B3425, the first histogram $h_1$ and the second histogram $h_2$ have been swapped. Thus, in the function, the first histogram $h_1$ becomes the second histogram $h_2$ and vice versa. The flow then moves to block B3430.

In block B3430, the image-comparison device stores or outputs the accumulated distance d, and then the flow ends in block B3435.

In some embodiments, if the detected shift value r is beyond a threshold, then the distance with the shift value r at the threshold can be computed and compared to the distance calculated for the zero-shift case (e.g., the distance calculated during the performance of some embodiments of block B3410). The image-comparison device may use the smaller of the two accumulated distances d as the accumulated distance d or use some other combination of the two accumulated distances d.

Also, in some embodiments the shift value r is not expected to be large, and some limitations on the shift value r may be used. Additionally, a weighted average between a basic EMD (which is not a SIEMD) and the SIEMD may be used where the weighting is based at least in part on the amount of the shift value r. For example, distances calculated for small shift values r may be mostly comprised of the SIEMD, while larger shift values r may cause the distance to essentially revert back to the basic EMD.

Figure 35:
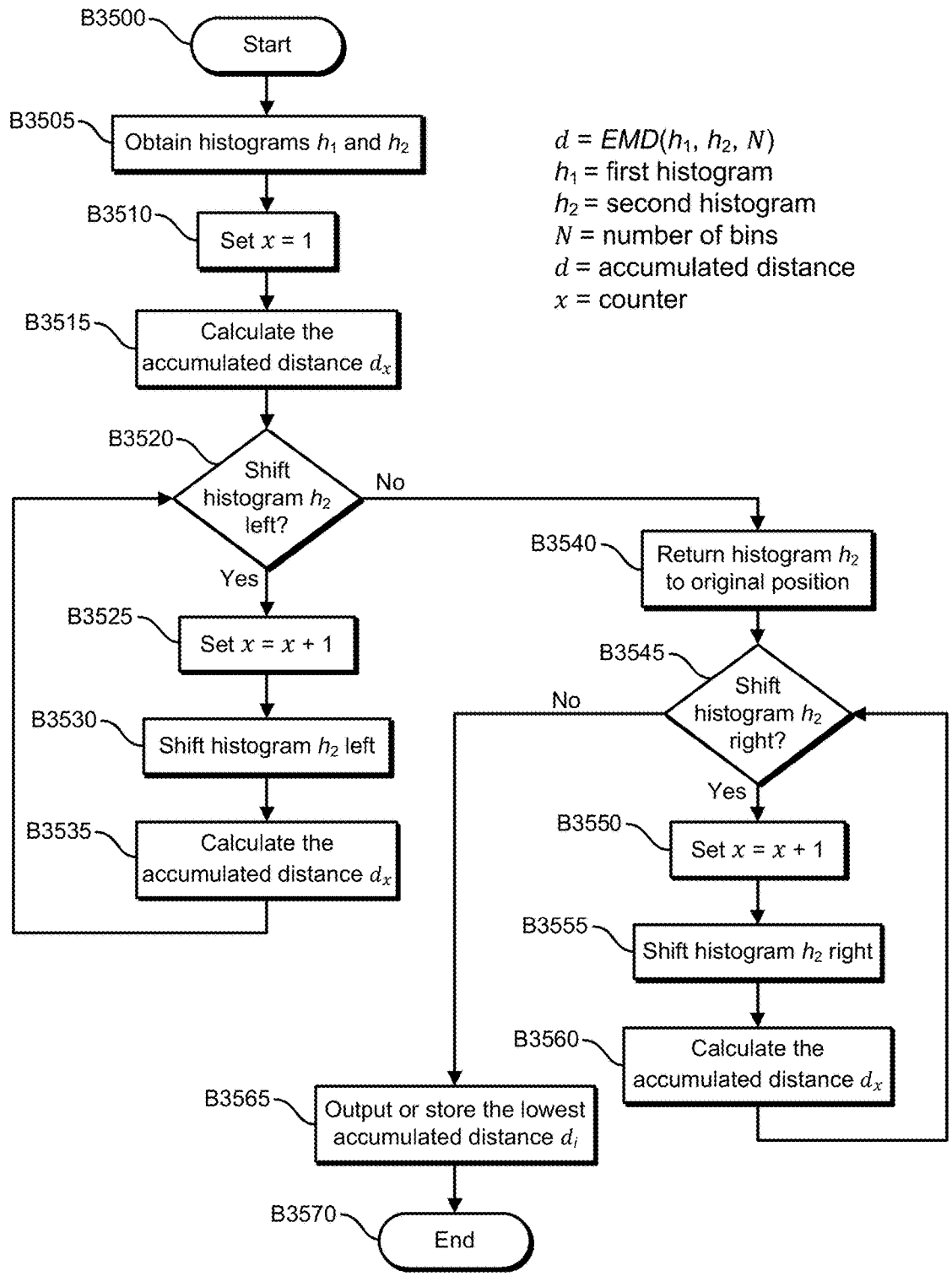
FIG. 35 illustrates an example embodiment of an operational flow for calculating a shift-invariant Earth Mover's Distance.

FIG. 35 illustrates an example embodiment of an operational flow for calculating a shift-invariant Earth Mover's Distance (SIEMD). The flow starts in block B3500 and then moves to block B3505, where an image-comparison device obtains a first histogram $h_1$ and a second histogram $h_2$. Then, in block B3510, the image-comparison device sets a counter x to zero. Next, in block B3515, the image-comparison device calculates an accumulated distance $d_x$ based on the first histogram $h_1$ and the second histogram $h_2$, for example as described in FIG. 28.

The flow then moves to block B3520, where the image-comparison device determines if the second histogram $h_2$ is to be shifted left. For example, if the highest-numbered non-empty bin of the second histogram $h_2$ is equal to or greater than the lowest-numbered non-empty bin of the first histogram $h_1$, then the image-comparison device may determine that the second histogram $h_2$ is to be shifted left. If yes (block B3520=Yes), then the flow moves to block B3525. In block B3525, the image-comparison device increases the count x by one. Next, in block B3530 the image-comparison device shifts the second histogram $h_2$ left by one or more bins (e.g., by one bin, by two bins, by three bins). The flow then moves to block B3535, where the image-comparison device calculates an accumulated distance $d_x$ based on the first histogram $h_1$ and the shifted second histogram $h_2$, for example as described in FIG. 28. The flow then returns to block B3520.

If in block B3520 the image-comparison device determines that the second histogram $h_2$ is not to be shifted left (block B3520=No), then the flow proceeds to block B3540, where the image-comparison device returns the second histogram $h_2$ to its original position.

The flow then moves to block B3545, where the image-comparison device determines if the second histogram $h_2$ is to be shifted right. For example, if the lowest-numbered non-empty bin of the second histogram $h_2$ is not equal to or greater than the highest-numbered non-empty bin of the first histogram $h_1$, then the image-comparison device may determine that the second histogram $h_2$ is to be shifted right. If yes (block B3545=Yes), then the flow moves to block B3550. In block B3550, the image-comparison device increases the count x by one. Next, in block B3555 the image-comparison device shifts the second histogram $h_2$ right (e.g., by one bin, by two bins, by three bins). The flow then moves to block B3560, where the image-comparison device calculates an accumulated distance $d_x$ based on the first histogram $h_1$ and the shifted second histogram $h_2$, for example as described in FIG. 28. The flow then returns to block B3545.

If in block B3545 the image-comparison device determines that the second histogram $h_2$ is not to be shifted right (block B3545=No), then the flow proceeds to block B3565, where the image-comparison device outputs or stores the lowest accumulated distance $d_i$, $i \in \{1, \ldots, x\}$, and then the flow ends in block B3570.

FIG. 36 illustrates an example embodiment of a system for comparing images. The system includes an image-comparison device 3600, which is a specially-configured computing device, and an image-capturing device 3610. Some embodiments include one or more additional image-comparison devices 3600, one or more additional image-capturing devices 3610, or a display device. In this embodiment, the devices communicate by means of one or more networks 3699. Also, in some embodiments the devices communicate by means of other wired or wireless channels.

The image-comparison device 3600 includes one or more processors 3601, one or more I/O components 3602, and storage 3603. Additionally, the hardware components of the image-comparison device 3600 communicate by means of one or more buses or other electrical connections.

The image-comparison device 3600 also includes a histogram-generation module 3603A, a distance-calculation module 3603B, an anomaly-detection module 3603C, and a communication module 3603D.

The histogram-generation module 3603A includes instructions that, when executed, or circuits that, when activated, cause the image-comparison device 3600 to generate respective histograms of pixel intensity values for images or image patches.

The distance-calculation module 3603B includes instructions that, when executed, or circuits that, when activated, cause the image-comparison device 3600 to calculate an accumulated distance between two histograms, for example as described in FIG. 28, 32, 33, 34, or 35.

The anomaly-detection module 3603C includes instructions that, when executed, or circuits that, when activated, cause the image-comparison device 3600 to detect anomalies in images by comparing the distances between images or patches of images (e.g., feature patches), for example by comparing a test image with one or more reference images. The anomaly-detection module 3603C may call the histogram-generation module 3603A or the distance-calculation module 3603B.

The communication module 3603D includes instructions that, when executed, or circuits that, when activated, cause the image-comparison device 3600 to communicate with one or more other devices, for example the image-capturing device 3610.

Also, the image-comparison device 3600 may include one or more of the image-adjustment module 903A, the similarity-map-generation module 903B, the normal-similarity-score-map module 903C, the feature-generation module 903D, and the local-patch-generation module 903E in FIG. 9.

The image-capturing device 3610 includes one or more processors 3611, one or more I/O components 3612, storage 3613, a communication module 3613A, and an image-capturing assembly 3614. The image-capturing assembly 3614 includes one or more imaging sensors, such as an x-ray detection sensor. The communication module 3613A includes instructions that, when executed, or circuits that, when activated, cause the image-capturing device 3610 to receive a request for an image from a requesting device, retrieve a requested image from the storage 3613, or send a retrieved image to the requesting device (e.g., the image-comparison device 3600).

As used herein, the conjunction "or" generally refers to an inclusive "or," though "or" may refer to an exclusive "or" if expressly indicated or if the context indicates that the "or" must be an exclusive "or."

The invention claimed is:

1. A device comprising:
   one or more processors; and
   one or more computer-readable media that are coupled to the one or more processors and that include instructions for
      obtaining a first image,
      obtaining a second image, and
      calculating respective distances between a histogram from a patch in the first image and respective histograms from patches in the second image,
      wherein calculating the respective distances is based in part on a no-cost shift, and
      wherein the no-cost shift indicates a shift
         that is applied to each bin in either the histogram from the patch in the first image or at least one of the respective histograms from the patches in the second image and
         that does not count toward the distance between the histogram from the patch in the first image and the at least one of the respective histograms from the patches in the second image.

2. The device of claim 1, wherein the patches in the second image include a central patch and other patches that are offset from the central patch.

3. The device of claim 2, wherein the central patch has an x, y position in the second image that is identical to an x, y position of the patch in the first image.

4. The device of claim 1, wherein the patches in the second image partially overlap each other.

5. The device of claim 4, wherein each patch in the first image and the second image is composed of two or more respective feature patches.

6. The device of claim 5, wherein each feature patch partially overlaps another feature patch.

7. The device of claim 1, wherein the no-cost shift is based on a number of surplus pixels and on a total number of pixels.

8. The device of claim 1, wherein calculating each of the respective distances includes calculating a difference between a number of pixels in a bin at index i in one histogram and a number of pixels in a bin at index i+s in another histogram, where s is the no-cost shift.

9. The device of claim 1, wherein the one or more computer-readable media further include instructions for identifying a patch in the second image that is most similar to the patch in the first image based on the respective distances.

10. A method comprising:
    obtaining a first image;
    obtaining a second image; and
    calculating respective dissimilarity scores between a histogram from a patch in the first image and respective histograms from patches in the second image,
    wherein calculating the respective dissimilarity score between the histogram from the patch in the first image and at least one of the respective histograms from the patches in the second image is based in part on a no-cost shift, and
    wherein the no-cost shift indicates a shift
       that is applied to a plurality of bins in either the histogram from the patch in the first image or the at least one of the respective histograms from the patches in the second image and
       that does not count toward the dissimilarity score between the histogram from the patch in the first image and the at least one of the respective histograms from the patches in the second image.

11. The method of claim 10, wherein the dissimilarity score is an Earth Mover's Distance.

12. The method of claim 11, wherein the Earth Mover's Distance is a shift-invariant Earth Mover's Distance.

13. The method of 10, wherein the patches in the second image partially overlap each other.

14. The method of claim 10, further comprising:
    identifying a patch in the second image that is most similar to the patch in the first image based on the respective dissimilarity scores.

15. The method of claim 14, further comprising:
    adding the dissimilarity score of the patch in the second image that is most similar to the patch in the first image to an image-similarity map.

16. The method of claim 10, wherein calculating each of the respective dissimilarity scores includes calculating a difference between a number of pixels in a bin at index i in one histogram and a number of pixels in a bin at index i+s in another histogram, where s is the no-cost shift.

17. One or more computer-readable media storing computer-executable instructions that, when executed by one or more computing devices, cause the one or more computing devices to perform operations comprising:
   obtaining a first image;
   obtaining a second image; and
   calculating respective dissimilarity scores between a histogram from a first patch in the first image and respective histograms from patches in the second image,
   wherein calculating the respective dissimilarity score between the histogram from the first patch in the first image and at least one of the respective histograms from the patches in the second image is based in part on a no-cost shift, and
   wherein the no-cost shift indicates a shift
      that is applied to a plurality of bins in either the histogram from the first patch in the first image or the at least one of the respective histograms from the patches in the second image and
      that does not count toward the dissimilarity score between the histogram from the first patch in the first image and the at least one of the respective histograms from the patches in the second image.

18. The one or more computer-readable media of claim 17, further comprising:
   dividing the first image into a plurality of patches,
   wherein the plurality of patches includes the first patch,
   wherein each patch of the plurality of patches includes two or more feature patches, and
   wherein each of the two or more feature patches overlaps another feature patch.

19. The one or more computer-readable media of claim 17,
   wherein calculating the respective dissimilarity scores between the histogram from the first patch in the first image and the respective histograms from the patches in the second image includes calculating a difference between a number of pixels in a bin at index i in one histogram and a number of pixels in a bin at index i+s in another histogram, where s is the no-cost shift.

20. The one or more computer-readable media of claim 17, wherein the no-cost shift is based on a number of surplus pixels and on a total number of pixels.

* * * * *